United States Patent [19]
Watanabe et al.

[11] Patent Number: 6,100,339

[45] Date of Patent: *Aug. 8, 2000

[54] CURABLE RESIN AND RESIN COMPOSITION COMPRISING THE SAME

[75] Inventors: Tomonari Watanabe, Yamato; Itaru Natori, Yokohama, both of Japan

[73] Assignee: Asahi Kasei Kogyo Kabushiki Kaisha, Osaka, Japan

[*] Notice: This patent is subject to a terminal disclaimer.

[21] Appl. No.: 08/836,757

[22] PCT Filed: Nov. 21, 1995

[86] PCT No.: PCT/JP95/02375

§ 371 Date: May 21, 1997

§ 102(e) Date: May 21, 1997

[87] PCT Pub. No.: WO96/16091

PCT Pub. Date: May 30, 1996

[30] Foreign Application Priority Data

Nov. 21, 1994 [JP] Japan ................................. 6-286899

[51] Int. Cl.[7] .......................... C08L 53/02; C08L 47/00
[52] U.S. Cl. .......................... 525/216; 525/98; 525/102; 525/105; 525/106; 525/123; 525/194.232; 525/297; 525/310; 525/314; 525/332.1; 525/332.8; 525/332.9; 525/338; 525/342; 525/350; 525/353; 525/375; 525/376; 525/379; 525/385; 525/386; 524/554
[58] Field of Search .................... 525/194, 216, 525/297, 314, 332.1, 332.3, 332.9, 342, 350, 353, 232, 338, 375, 376, 379, 385, 386, 98, 102, 105, 106, 123; 524/554

[56] References Cited

U.S. PATENT DOCUMENTS

| | | |
|---|---|---|
| 4,020,251 | 4/1977 | Hsieh . |
| 4,051,199 | 9/1977 | Udipi et al. . |
| 4,113,930 | 9/1978 | Moczygemba . |
| 4,127,710 | 11/1978 | Hsieh . |
| 4,131,653 | 12/1978 | Hsieh et al. . |
| 4,138,536 | 2/1979 | Hsieh . |
| 4,179,480 | 12/1979 | Hsieh . |
| 4,237,246 | 12/1980 | Hsieh . |
| 4,578,429 | 3/1986 | Gergen et al. ........................ 525/291 |
| 5,830,965 | 11/1998 | Imaizumi et al. ................... 526/340 X |

FOREIGN PATENT DOCUMENTS 1042625  9/1964  United Kingdom .

OTHER PUBLICATIONS

Marvel et al., The Journal of the American Chemical Society, vol. 81, pp. 448–452 (1959).

Lefebvre et al., Journal of Polymer Science: Part A, vol. 2, pp. 3277–3295 (1964).

Cassidy et al., Journal of Polymer Science: Part A., vol. 3, pp. 1553–1565 (1965).

Mango et al., Polymer Preprints, American Chemical Society Div. Polymer Chemistry, vol. 12, No. 2, pp. 402–409 (1971).

Mango et al., Die Makromolekulare Chemie 163, pp. 13–36 (1973).

Sharaby et al., Journal of Polymer Science, Polymer Chemistry Edition, vol. 20, pp. 901–915 (1982).

Francois et al., Makromol. Chemistry, vol. 191, pp. 2743–2753 (1990).

*Primary Examiner*—Fred Teskin
*Attorney, Agent, or Firm*—Birch, Stewart, Kolasch & Birch, LLP

[57] ABSTRACT

Disclosed is a curable resin which comprises at least one polymer selected from polymers each independently having a polymer chain represented by the following formula (I):

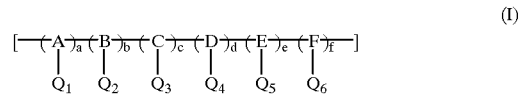

wherein A to F are monomer units constituting a main chain of the polymer and are arranged in any order, and a to f are, respectively, wt % of A to F, based on the total weight of A to F; wherein each A is independently selected from cyclic olefin monomer units having no reactive group, each B is independently selected cyclic conjugated diene monomer units having no reactive group, each C to F is independently selected from comonomer units having no reactive group, and copolymerizable with A and B, wherein $Q_1$ to $Q_6$ are reactive groups, and wherein the average total number (J) of $Q_1$ to $Q_6$ of the at least one polymer satisfies: $1 \leq (J) \leq 4$, the polymer having an ME of from 1,000 to 5,000,000. A resin composition containing the curable resin is also disclosed. The resin and resin composition of the present invention is advantageous in that both the resin and the resin composition not only have excellent durability and resistance to chemicals as well as excellent thermal and mechanical properties, but also have excellent compatibility with other resins. Therefore, the resin and the resin composition can be advantageously used as a material for use in various fields, such as automobiles, construction, civil engineering, electric and electronic appliances, fiber industry, medical equipments and other resin products.

21 Claims, 2 Drawing Sheets

CURABLE RESIN AND RESIN COMPOSITION COMPRISING THE SAME

BACKGROUND OF THE INVENTION

1. Field of the Invention

The present invention relates to a novel curable resin comprising a polymer which contains a cyclic monomer unit and which contains a reactive group, and a resin composition comprising the same. More particularly, the present invention is concerned with a curable resin comprising a polymer which contains a cyclic monomer unit derived from a cyclic conjugated diene and which contains a reactive group in a specific amount, and a resin composition comprising the curable resin. The curable resin and resin composition of the present invention is advantageous in that both the resin and the resin composition not only have excellent durability and resistance to chemicals as well as excellent thermal and mechanical properties, but also have excellent compatibility with other resins. Therefore, the resin and the resin composition can be advantageously used as a material for use in various fields, such as automobiles, construction, civil engineering, electric and electronic appliances, fiber industry, medical equipments and other resin products.

2. Prior Art

In recent years, polymer chemistry has continuously made progress through various innovations in order to meet commercial demands which have been increasingly diversified. Especially, in the field of polymer materials to be used as commercially important materials, extensive and intensive studies have been made toward developing polymers having more excellent thermal and mechanical properties. Various proposals have been made with respect to such polymers and methods for the production thereof. Of such polymers, a curable resin having functional groups which are introduced into the resin during or after the polymerization reaction for the production of a base resin has been drawing attention. With respect to such a curable resin, the thermal and mechanical properties thereof can be improved simply by reacting the functional groups contained in the curable resin. Therefore, such a curable resin has been used in a wide variety of fields.

Conventionally, various curable resins have been developed. With respect to the above-mentioned curable resin having functional groups (wherein the resin comprises a base polymer and functional groups which are bonded to the terminals of the molecular chain of the base polymer or inserted in the molecular chain of the base polymer), the improvement of properties of the resin is achieved by reacting the functional groups contained in the resin to form a crosslinked structure. Therefore, with respect to new development of curable resins, studies have conventionally been made with respect mainly to functional groups which are to be utilized for forming a crosslinked structure by UV crosslinking reaction, electron beam crosslinking reaction, ionic crosslinking reaction, wet crosslinking reaction (curing reaction) or various chemical crosslinking reactions (such as a transesterification, a hydrazone-forming reaction, a hydrazide-forming reaction, an oxime-forming reaction and an ammonium-forming reaction). An attempt to improve curable resins by improving a base polymer per se has almost not been made. However, in accordance with the recent tendency of diversification of commercial demands for curable resins, there has been a strong demand for curable resins which are improved not only in respect of resistance to chemicals and weather resistance as well as thermal and mechanical properties, but also in respect of the compatibility with other resins, so that it has recently been desired to develop a completely novel curable resin which is much improved in respect of the above-mentioned properties and characteristics.

For example, in the field of electronic appliances for use in telecommunication, public service, industry and the like, the demand for compactness and high density attachment of parts has greatly increased. Accordingly, there has also been an increasing demand for materials which are improved with respect to thermal resistance, dimensional stability, electrical properties, flame retardancy and the like. For example, with respect to a printed circuit board, in which a copper clad laminate comprising a substrate produced from a curable functional polyphenylene ether resin has conventionally been used, a cured resin obtained from the curable polyphenylene ether resin has excellent electrical and mechanical properties; however, the cured resin is not satisfactory for use in a substrate for a printed circuit board in respect of thermal resistance and chemical resistance.

In the field of construction and civil engineering, various materials comprising a curable resin have been developed. Examples of such materials include a sealant comprising a polypropylene glycol-modified silicone curable resin (see, for example, Examined Japanese Patent Application Publication No. 61-18582), and a polymer concrete (mortar) which contains a curable resin (such as an unsaturated polyester, an epoxy resin, a vinyl ester resin, a polyurethane or a phenolic resin) as a binder for improving the toughness of a cured concrete (mortar).

However, in the field of sealants, the commercially available sealants, i.e., a polysulfide sealant, a polyurethane sealant and a silicone sealant, each have respective problems as explained below. The polysulfide sealant has disadvantages in that the sealant has a low curing rate, so that a cured sealant obtained therefrom has surface tack, and that the sealant is not satisfactory in respect of thermal resistance, weather resistance and fatigue resistance. The polyurethane sealant not only has the same disadvantages as in the polysulfide sealant, but also has a disadvantage in that it has poor adherence to glass. With respect to the silicone (i.e., organopolysiloxane) sealant, it is satisfactory in respect of the curing rate, thermal resistance, weather resistance and fatigue resistance; however, it has disadvantages in that it is difficult to coat a cured sealant obtained therefrom with a paint, and that the fungus resistance of the sealant is poor. Therefore, it has been desired to improve these sealants. For example, for solving the above-mentioned problems, Examined Japanese Patent Application Publication No. 61-18582 proposes a curable resin obtained by modifying a silicone with a high molecular weight polypropylene glycol; however, even this curable resin is not satisfactory in respect of the adherence to glass and durability, so that use of such a curable resin is inevitably limited.

In the field of the polymer concrete (mortar) also, the conventional polymer concrete has problems in resistance to chemicals, durability and mechanical properties.

Also, in industrial fields other than those mentioned above, such as paints, adhesives, printing materials, and electric and electronic parts, in which a curable resin is used, the use of the curable resin is accompanied by the above-mentioned problems. Therefore, in various fields in which a curable resin is used, it has been desired to improve the properties of the curable resin.

As one of the most practical means for solving the above-mentioned problems, it has been attempted to develop a technique of improving the structures of the main molecular chains of polymers of cyclic conjugated diene monomers (in homopolymerizing or copolymerizing not only a monomer having a relatively small steric hindrance, e.g., butadiene or isoprene, but also a monomer having a large steric hindrance, e.g., a cyclic conjugated diene monomer, and, additionally, hydrogenating the resultant conjugated diene polymer, thereby forming a cyclic olefin monomer unit in the molecular chain) so as to obtain cyclic conjugated diene polymers having excellent thermal and mechanical properties, excellent durability (such as thermal resistance and weather resistance) and excellent chemical resistance.

With respect to the homopolymerization or copolymerization of a monomer having a relatively small steric hindrance, e.g., butadiene or isoprene, catalyst systems having a polymerization activity which is satisfactory to a certain extent have been successfully developed. However, a catalyst system which exhibits a satisfactory polymerization activity in the homopolymerization or copolymerization of monomers having a large steric hindrance, e.g., a cyclic conjugated diene monomer, has not yet been developed.

That is, by conventional techniques, even homopolymerization of a cyclic conjugated diene monomer is difficult, so that a homopolymer having a desired high molecular weight cannot be obtained. Furthermore, an attempt to copolymerize a cyclic conjugated diene with a monomer other than the cyclic conjugated diene, for the purpose of obtaining a polymer having optimized thermal and mechanical properties in order to meet a wide variety of commercial needs, has been unsuccessful with the result that the products obtained are only oligomers having a low molecular weight. Further, there has been no report with respect to a polymer containing a substituted cyclic conjugated diene monomer unit and/or a substituted cyclic olefin monomer unit, wherein the monomer unit is considered to be useful for improving the properties (especially, durability, such as thermal resistance and weather resistance, and mechanical properties) of the polymer.

J. Am. Chem. Soc., 81, 448 (1959) discloses a cyclohexadiene homopolymer and a polymerization method therefor, which homopolymer is obtained by polymerizing 1,3-cyclohexadiene (a typical example of a cyclic conjugated diene monomer), using a composite catalyst comprised of titanium tetrachloride and triisobutylaluminum. However, the polymerization method disclosed in this prior art document is disadvantageous in that the use of a large amount of the catalyst is necessary, and the polymerization reaction must be conducted for a prolonged period of time, and that the obtained polymer has only an extremely low molecular weight. Therefore, the polymer obtained by the technique of this prior art document is of no industrial value. Further, this prior art document has no teaching or suggestion of a method for introducing a substituted cyclic conjugated diene monomer unit and/or a substituted cyclic olefin monomer unit into the main molecular chain of a polymer as well as modification of a polymer containing a cyclic conjugated diene monomer unit and/or a cyclic olefin monomer unit.

J. Polym. Sci., Pt. A, 2, 3277 (1964) discloses methods for producing a cyclohexadiene homopolymer, in which the polymerization of 1,3-cyclohexadiene is conducted by various polymerization methods, such as radical polymerization, cationic polymerization, anionic polymerization and coordination polymerization. In any of the methods disclosed in this prior art document, however, the polymers obtained have only an extremely low molecular weight. Therefore, the polymers obtained by the techniques of this prior art document are of no industrial value. Further, this prior art document has no teaching or suggestion of a method for introducing a substituted cyclic conjugated diene monomer unit and/or a substituted cyclic olefin monomer unit into the polymeric molecular chain of a polymer as well as modification of a polymer containing a cyclic conjugated diene monomer unit and/or a cyclic olefin monomer unit.

British Patent Application No. 1,042,625 discloses a method for producing a cyclohexadiene homopolymer, in which the polymerization of 1,3-cyclohexadiene is conducted using a large amount of an organolithium compound as a catalyst. In the polymerization method disclosed in British Patent Application No. 1,042,625, the catalyst must be used in an amount as large as 1 to 2 wt %, based on the total weight of the monomers. Therefore, this method is economically disadvantageous. Further, the polymer obtained by this method has only an extremely low molecular weight. Moreover, the method of this prior art document has disadvantages in that the polymer obtained contains a large amount of catalyst residue, which is very difficult to remove from the polymer, so that the polymer obtained by this method is of no commercial value. Furthermore, this prior art document has no teaching or suggestion of a method for introducing a substituted cyclic conjugated diene monomer unit and/or a substituted cyclic olefin monomer unit into the main molecular chain of a polymer as well as modification of a polymer containing a cyclic conjugated diene monomer unit and/or a cyclic olefin monomer unit.

J. Polym. Sci., Pt. A, 3, 1553 (1965) discloses a cyclohexadiene homopolymer, which is obtained by polymerizing 1,3-cyclohexadiene using an organolithium compound as a catalyst. In this prior art document, the polymerization reaction must be continued for a period as long as 5 weeks, however, the polymer obtained has a number average molecular weight of only 20,000 or less. Further, this prior art document has no teaching or suggestion of a method for introducing a substituted cyclic conjugated diene monomer unit and/or a substituted cyclic olefin monomer unit into the main molecular chain of a polymer as well as modification of a polymer containing a cyclic conjugated diene monomer unit and/or a cyclic olefin monomer unit.

Polym. Prepr. (Amer. Chem. Soc., Div. Polym. Chem.) 12, 402 (1971) teaches that when the polymerization of 1,3-cyclohexadiene is conducted using an organolithium compound as a catalyst, the upper limit of the number average molecular weight of the cyclohexadiene homopolymer obtained is only from 10,000 to 15,000. Further, this document teaches that the reason for such a small molecular weight resides in the fact that, concurrently with the polymerization reaction, not only does a transfer reaction occur, which is caused by the abstraction of a lithium cation present in the polymer terminal, but also a lithium hydride elimination reaction occurs. Furthermore, this prior art document has no teaching or suggestion of a method for introducing a substituted cyclic conjugated diene monomer unit and/or a substituted cyclic olefin monomer unit into the main molecular chain of a polymer as well as modification of a polymer containing a cyclic conjugated diene monomer unit and/or a cyclic olefin monomer unit.

Die Makromolekulare Chemie., 163, 13 (1973) discloses a cyclohexadiene homopolymer which is obtained by polymerizing 1,3-cyclohexadiene using a large amount of an organolithium compound as a catalyst. However, the polymer obtained in this prior art document is an oligomer having a number average molecular weight of only 6,500. Further, this prior art document has no teaching or suggestion of a method for introducing a substituted cyclic conjugated diene monomer unit and/or a substituted cyclic olefin monomer unit into the main molecular chain of a polymer as well as modification of a polymer containing a cyclic conjugated diene monomer unit and/or a cyclic olefin monomer unit.

J. Polym. Sci., Polym. Chem. Ed., 20, 901 (1982) discloses a cyclohexadiene homopolymer which is obtained by polymerizing 1,3-cyclohexadiene using an organosodium compound as a catalyst. In this prior art document, the organosodium compound used is sodium naphthalene, and a radical anion derived from the sodium naphthalene forms a dianion which functions as a polymerization initiation site. This means that although the cyclohexadiene homopolymer reported in this document has an apparent number average molecular weight of 38,700, this homopolymer is actually only a combination of two polymeric molecular chains, each having a number average molecular weight of 19,350, which chains respectively extend from the polymerization initiation site in two different directions. Further, in the polymerization method disclosed in this document, the polymerization reaction needs to be conducted at an extremely low temperature. Therefore, the technique of this prior art document is of no industrial value. Furthermore, this prior art document has no teaching or suggestion of a method for introducing a substituted cyclic conjugated diene monomer unit and/or a substituted cyclic olefin monomer unit into the main molecular chain of a polymer as well as modification of a polymer containing a cyclic conjugated diene monomer unit and/or a cyclic olefin monomer unit.

Makromol. Chem., 191, 2743 (1990) discloses a method for polymerizing 1,3-cyclohexadiene using a polystyryllithium as a polymerization initiator. In this prior art document, it is described that concurrently with the polymerization reaction, not only a transfer reaction, which is caused by the abstraction of a lithium cation present in the polymer terminal, but also a lithium hydride elimination reaction vigorously occurs. Further, it is reported that even though the polymerization is conducted using a polystyryllithium as a polymerization initiator, a styrene-cyclohexadiene block copolymer cannot be obtained at room temperature, and the product obtained is only a cyclohexadiene homopolymer having a low molecular weight. Furthermore, this prior art document has no teaching or suggestion of a method for introducing a substituted cyclic conjugated diene monomer unit and/or a substituted cyclic olefin monomer unit into the main molecular chain of a polymer as well as modification of a polymer containing a cyclic conjugated diene monomer unit and/or a cyclic olefin monomer unit.

As can be easily understood from the above, in any of the conventional techniques, it has been impossible to obtain an excellent polymer containing a cyclic conjugated diene monomer unit and/or a cyclic olefin monomer unit and having a reactive group, which can be satisfactorily used as an industrial material.

In view of the above, it has been earnestly desired to provide a novel curable resin and a resin composition comprising the curable resin, which not only have excellent durability and resistance to chemicals as well as excellent thermal and mechanical properties, but also excellent compatibility with other resins.

SUMMARY OF THE INVENTION

In these situations, the present inventors previously made extensive and intensive studies with a view toward developing a novel cyclic conjugated diene polymer comprising at least one type of cyclic conjugated diene monomer unit, or comprising at least one type of cyclic conjugated diene monomer unit and a monomer unit derived from at least one type of monomer other than the above-mentioned cyclic conjugated diene monomer, wherein the other monomer is copolymerizable with the cyclic conjugated diene monomer. The above-mentioned cyclic conjugated diene polymer has a high number average molecular weight, so that it has not only excellent thermal properties with regard to, for example, a melting temperature, a glass transition temperature and a heat distortion temperature, but also excellent mechanical properties, such as high tensile modulus and high flexural modulus. The present inventors have also studied a method for producing such an excellent cyclic conjugated diene polymer. As a result, the present inventors successfully developed a novel polymerization catalyst useful for production of such a polymer as mentioned above, which catalyst has an excellent catalytic activity for not only achieving a desired high polymerization degree, but also effectively and efficiently performing a living anionic polymerization which enables block copolymerization of a cyclic conjugated diene monomer and at least one type of comonomer which is copolymerizable with the cyclic conjugated diene monomer. With such a novel polymerization catalyst, it has for the first time become possible to synthesize a novel cyclic conjugated diene polymer, which has never been reported. In addition, a technique to obtain a cyclic conjugated diene polymer, in which monomer units derived from cyclic conjugated diene monomers are introduced, in a desired proportion and in a desired configuration, as a part or all of monomer units constituting a main chain of the polymer, has been developed (see WO/94/28038). In addition, the present inventors have made further studies and, as a result, have developed a technique to produce a polymer containing a saturated cyclic monomer unit, which polymer is derived from the above-mentioned cyclic conjugated diene polymer (see WO/94/29359).

The present inventors have made still further studies. As a result, the present inventors have found that, by introducing a reactive group in a specific amount into the above-mentioned polymer containing cyclic monomer units derived from cyclic conjugated diene monomers (i.e., a cyclic conjugated diene polymer or a cyclic olefin monomer unit-containing polymer obtained by saturating a part or all of the carbon-to-carbon double bonds of the cyclic conjugated diene monomer units in the above-mentioned cyclic conjugated diene polymer), a curable resin can be obtained. This curable resin is advantageous in that it not only has excellent durability and resistance to chemicals as well as excellent thermal and mechanical properties, but also excellent compatibility with other resins. The present invention has been made, based on these novel findings.

Accordingly, it is an object of the present invention to provide a novel curable resin which is advantageous in that it not only has excellent durability and resistance to chemicals as well as excellent thermal and mechanical properties, but also has an excellent compatibility with other resins.

It is another object of the present invention to provide a resin composition comprising the above-mentioned curable resin and at least one type resin selected from other resins.

The foregoing and other objects, features and advantages of the present invention will be apparent from the following detailed description and claims, taken in connection with the accompanying drawings.

DETAILED DESCRIPTION OF THE INVENTION

Figure 1:
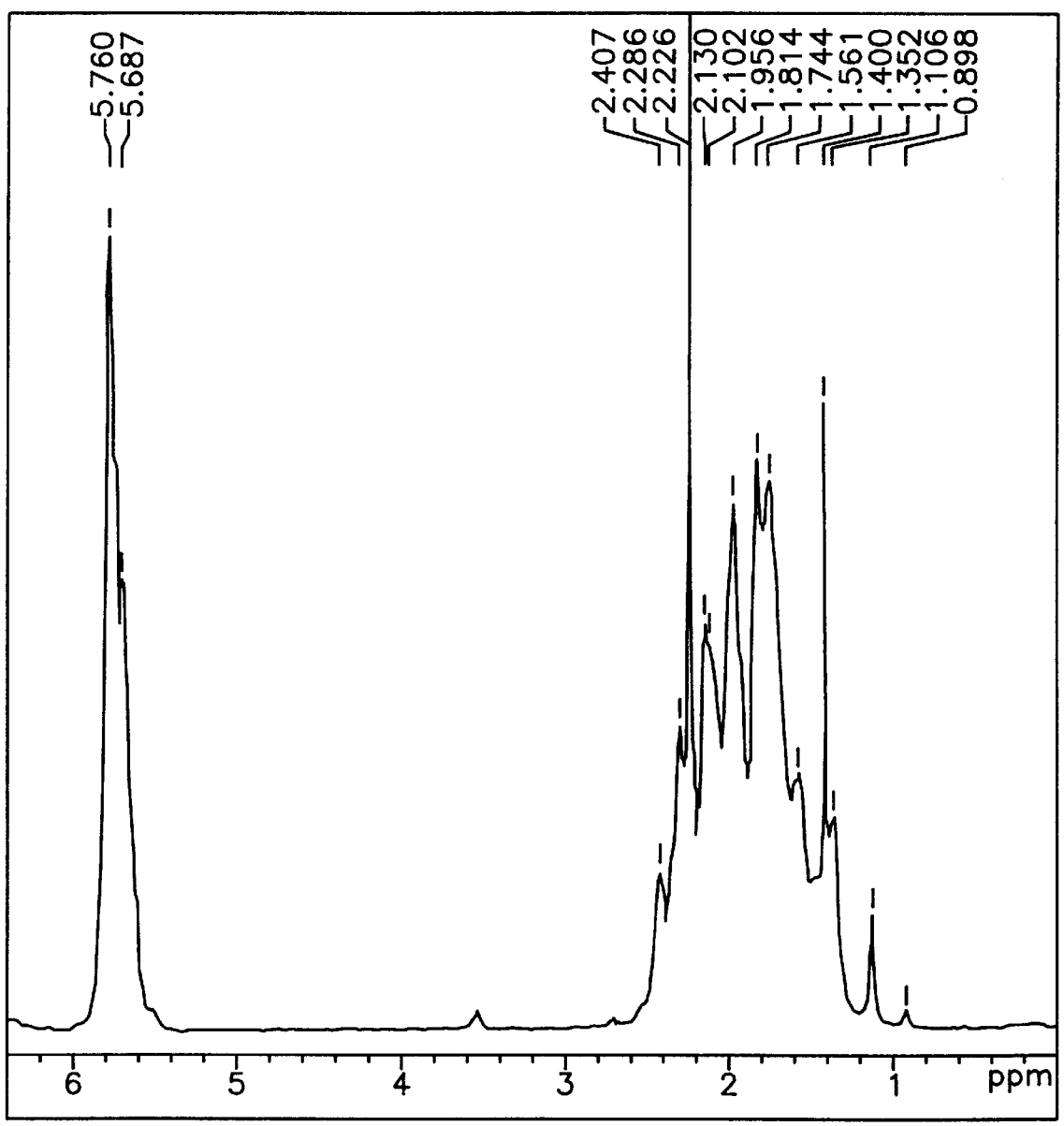
FIG. 1 is a chart showing the $^1$H-NMR spectrum of the trimethoxysilane-modified polycyclohexadiene obtained in Example 2 (in FIG. 1, each of the positions of peaks on the spectrum is individually indicated by a short line drawn above the spectrum)
Figure 2:
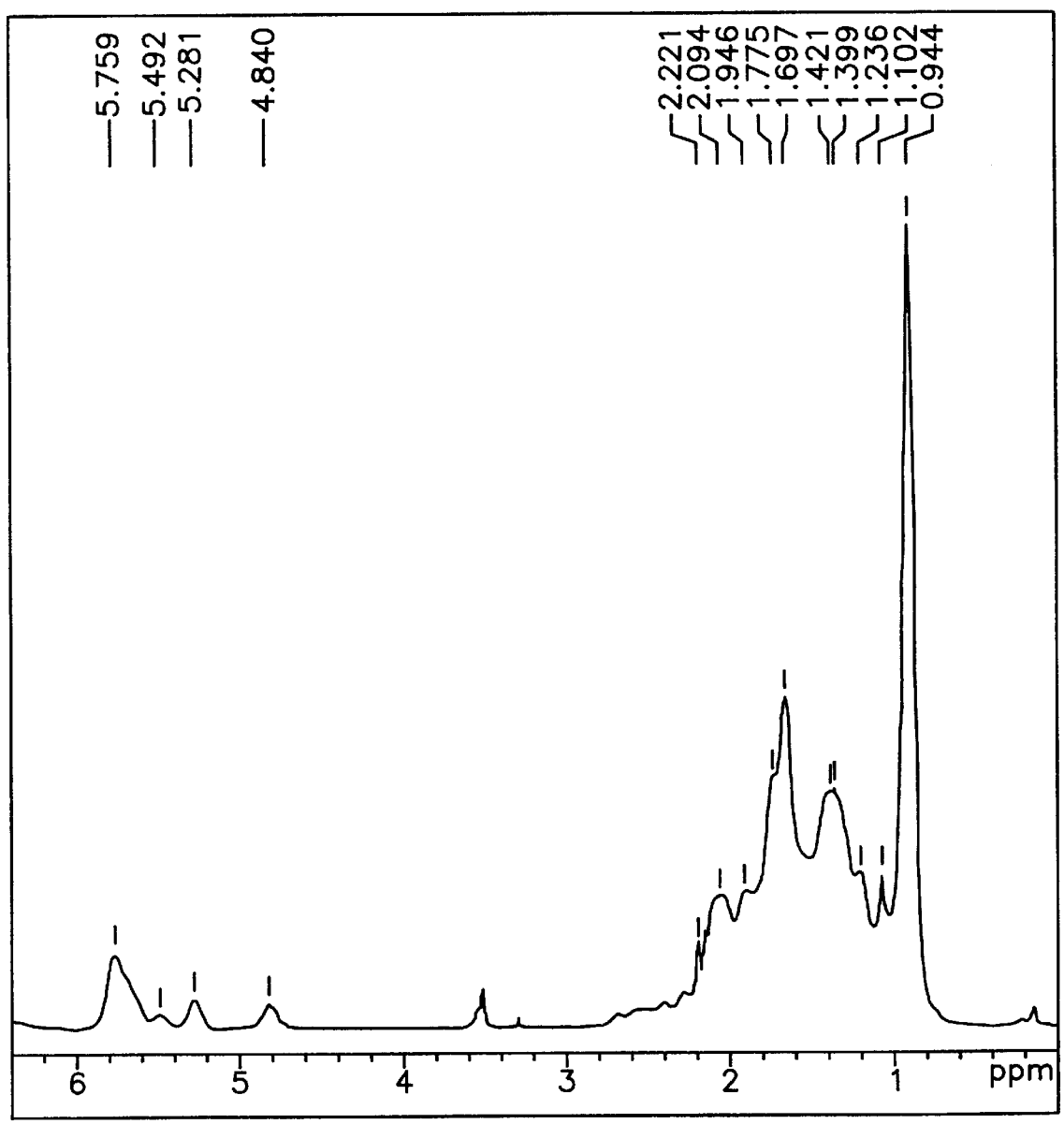
FIG. 2 is a chart showing the $^1$H-NMR spectrum of the cyclohexadiene-isoprene-cyclohexadiene triblock copolymer obtained in Example 67 (in FIG. 2, each of the positions of peaks on the spectrum is individually indicated by a short line drawn above the spectrum).

In one aspect of the present invention, there is provided a curable resin which comprises at least one polymer selected from polymers each independently having a polymer chain represented by the following formula (1):

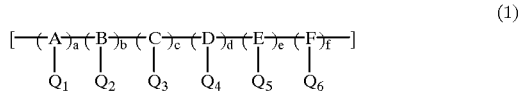
(1)

wherein A to F are monomer units constituting a main chain of the polymer chain in which monomer units A to F are arranged in any order, and a to f are, respectively, weight percentages of monomer units A to F, based on the total weight of monomer units A to F; wherein:
each A monomer unit is independently selected from the group consisting of cyclic olefin monomer units each having no reactive group,
each B monomer unit is independently selected from the group consisting of cyclic conjugated diene monomer units each having no reactive group,
each C monomer unit is independently selected from the group consisting of chain conjugated diene monomer units each having no reactive group,
each D monomer unit is independently selected from the group consisting of vinyl aromatic monomer units each having no reactive group,
each E monomer unit is independently selected from the group consisting of polar monomer units each having no reactive group, and
each F monomer unit is independently selected from the group consisting of an ethylene monomer unit having no reactive group and α-olefin monomer units each having no reactive group;
wherein:
a to f satisfy the following requirements:
a+b+c+d+e+f=100,
0≦a, b≦100,
0≦c, d, e, f<100, and
a+b≠0; and
wherein:
$Q_1$ to $Q_6$ are reactive groups, which are, respectively, directly bonded to monomer units A to F wherein $Q_1$ to $Q_6$ are the same or different,
wherein the average total number (J) of $Q_1$ to $Q_6$ of said at least one polymer satisfies the following requirement:

1≦(J)≦4, the polymer having a number average molecular weight of from 1,000 to 5,000,000.

In another aspect of the present invention, there is provided a resin composition comprising (α) the above-mentioned curable resin and (β) a resin other than the resin (α), wherein the weight percentage of the resin (β), based on the total weight of the resin (α) and the resin (α), is represented by the formula:

0.01 wt %≦β≦99.9 wt %.

In still another aspect of the present invention, there is provided a resin composition comprising (α) the above-mentioned curable resin, (β) a resin other than the resin (α), and at least one crosslinking agent (γ), wherein the weight percentages of the resin (α) and the crosslinking agent (γ), based on the total weight of the resin (α), the resin (β) and the crosslinking agent (γ), are, respectively, represented by the formulae: 0 wt %≦β≦100 wt %, and 0 wt %<γ<100 wt %.

For an easy understanding of the present invention, the essential features and various embodiments of the present invention are enumerated below.

1. A curable resin which comprises at least one polymer selected from polymers each independently having a polymer chain represented by the following formula (I):

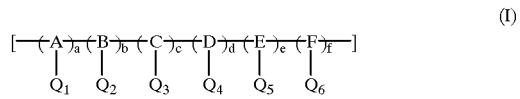
(I)

wherein A to F are monomer units constituting a main chain of the polymer chain in which monomer units A to F are arranged in any order, and a to f are, respectively, weight percentages of monomer units A to F, based on the total weight of monomer units A to F; wherein:
each A monomer unit is independently selected from the group consisting of cyclic olefin monomer units each having no reactive group,
each B monomer unit is independently selected from the group consisting of cyclic conjugated diene monomer units each having no reactive group,
each C monomer unit is independently selected from the group consisting of chain conjugated diene monomer units each having no reactive group,
each D monomer unit is independently selected from the group consisting of vinyl aromatic monomer units each having no reactive group,
each E monomer unit is independently selected from the group consisting of polar monomer units each having no reactive group, and
each F monomer unit is independently selected from the group consisting of an ethylene monomer unit having no reactive group and α-olefin monomer units each having no reactive group;
wherein:
a to f satisfy the following requirements:
a+b+c+d+e+f=100,
0≦a, b≦100,
0≦c, d, e, f<100, and
a+b≠0; and
wherein:
$Q_1$ to $Q_6$ are reactive groups, which are, respectively, directly bonded to monomer units A to F wherein $Q_1$ to $Q_6$ are the same or different,
wherein the average total number (J) of $Q_1$ to $Q_6$ of said at least one polymer satisfies the following requirement:

1≦(J)≦4, the polymer having a number average molecular weight of from 1,000 to 5,000,000.

2. The curable resin according to item 1 above, wherein each of reactive groups $Q_1$ to $Q_6$ independently represents a functional group selected from the group consisting of a $C_4$–$C_{20}$ cyclodienyl group, a thiol group, a carboxyl group, an acid anhydride-containing group, a hydrazinocarbonyl group, an amino group, a hydroxyl group, an epoxy group, an imino group, an isocyanate group, a sulfonic acid group, an ester group, a silyl group, a siloxy group, a vinyl group, a methylol group, a silanol group, a silyl ether group, a silyl ester group, an ether group, an epoxy group, a carbonyl group, a formyloxy group, an imido group, an acetoxy group, an alkoxysilane group and an oxazoline group, or independently represents a hydrocarbon group substituted with the functional group, the hydrocarbon group being selected from the group consisting of a $C_1$–$C_{20}$ alkyl group, a $C_2$–$C_{20}$ unsaturated hydrocarbon group, a $C_3$–$C_{20}$ cycloalkyl group, a $C_5$–$C_{20}$ aryl group and a $C_4$–$C_{20}$ cyclodienyl group, or independently represents an organic compound residue, exclusive of the hydrocarbon group, containing the functional group or the hydrocarbon group substituted with the functional group.

3. The curable resin according to item 2 above, wherein each of the reactive groups $Q_1$ to $Q_6$ independently represents a functional group selected from the group consisting of a silyl group, a silyl ether group, a siloxy group, a silanol group, a silyl ester group, a vinyl group and an epoxy group, or independently represents an organic compound residue containing the functional group.

4. The curable resin according to any one of items 1 to 3 above, wherein a satisfies the requirement: a=100.

5. The curable resin according to any one of items 1 to 3 above, wherein a and b satisfy the requirements: a+b=100, and 0<b.

6. The curable resin according to any one of items 1 to 3 above, wherein a and c satisfy the requirements: a+c=100, and 0<c.

7. The curable resin according to any one of items 1 to 3 above, wherein a and b satisfy the requirements: 0.001≦a+b<100, and 0.01≦a<100.

8. The curable resin according to any one of items 1 to 3 above, wherein a to c satisfy the requirement: a+b+c=100, and at least one requirement selected from the group consisting of 0<b and 0<c.

9. The curable resin according to any one of items 1 to 3 above, wherein a to c satisfy the requirement: 0.01≦a+b+c<100, and at least one requirement selected from the group consisting of 0.1≦a<100, 0≦b, and 0<c.

10. The curable resin according to any one of items 1 to 3 above, wherein b and c satisfy the requirements: b=0 and c=0.

11. The curable resin according to any one of items 1 to 10 above, wherein at least one polymer is a block copolymer having at least one polymer block containing at least one A monomer unit.

12. A sealant comprising a curable resin of any one of items 1 to 11 above.

13. An adhesive comprising a curable resin of any one of items 1 to 11 above.

14. A paint comprising a curable resin of any one of items 1 to 11 above.

15. An additive for a cement, comprising a curable resin of any one of items 1 to 11 above.

16. A resin composition comprising a resin ($\alpha$) of any one of items 1 to 11 above and a resin ($\beta$) other than the resin ($\alpha$), wherein the weight percentage of the resin ($\beta$), based on the total weight of the resin ($\alpha$) and the resin ($\beta$), is represented by the formula: 0.01 wt %≦$\beta$≦99.9 wt %.

17. A resin composition comprising a resin ($\alpha$) of any one of items 1 to 11 above, a resin ($\beta$) other than the resin ($\alpha$), and at least one crosslinking agent ($\gamma$), wherein the weight percentages of the resin ($\beta$) and the crosslinking agent ($\gamma$), based on the total weight of the resin ($\alpha$), the resin ($\beta$) and the crosslinking agent ($\gamma$), are, respectively, represented by the formulae:

0 wt %≦$\beta$<100 wt %, and 0 wt %<$\gamma$<100 wt %.

18. A sealant comprising a resin composition of item 16 or 17 above.

19. An adhesive comprising a resin composition of item 16 or 17 above.

20. A paint comprising a resin composition of item 16 or 17 above.

21. An additive for a cement, comprising a resin composition of item 16 or 17 above.

In the present invention, the monomer units of the polymer are named in accordance with a nomenclature such that the names of the original monomers from which the monomer units are derived are used with the term "unit" attached thereto. For example, the term "cyclic conjugated diene monomer unit" means a monomer unit which is formed in a polymer obtained by the polymerization of a cyclic conjugated diene monomer and which has a molecular structure such that a cycloalkene is bonded at two carbon atoms of a skeleton thereof. Further, the term "cyclic olefin monomer unit" means a monomer unit which is formed in a polymer obtained by the polymerization of a cyclic olefin monomer and which has a molecular structure such that a cycloalkane is bonded at two carbon atoms of a skeleton thereof.

In the present invention, representative examples of polymers containing a cyclic monomer unit (i.e., cyclic conjugated diene monomer unit and/or cyclic olefin monomer unit) and having a reactive group include a polymer which comprises a main chain comprised solely of at least one monomer unit selected from the group consisting of cyclic conjugated diene monomer units and which has a reactive group, and a polymer which comprises a main chain comprised of at least one monomer unit selected from the group consisting of cyclic conjugated diene monomer units and a monomer unit derived from at least one comonomer copolymerizable with the conjugated diene monomer and which has a reactive group.

More specific examples of cyclic monomer unit-containing polymers having a reactive group include a homopolymer of a cyclic conjugated diene monomer, which has a reactive group, a copolymer of at least two different types of cyclic conjugated diene monomers, which has a reactive group, and a copolymer of at least one cyclic conjugated diene monomer and at least one comonomer copolymerizable with the cyclic conjugated diene monomer, which has a reactive group.

Most preferred examples of cyclic monomer unit-containing polymers having a reactive group include a polymer which has a main chain comprised partly or entirely of at least one type of monomer unit selected from the group consisting of cyclic conjugated diene monomer units, wherein the cyclic conjugated diene monomer unit has a cyclohexene ring, and which has a reactive group.

The curable resin of the present invention may contain two or more different types of the above-mentioned polymers.

In the present invention, the cyclic olefin monomer unit is at least one member selected from cyclic olefin monomer units having a carbocyclic structure.

It is preferred that the cyclic olefin monomer unit is at least one member selected from cyclic olefin monomer units having a 5 to 8-membered carbocyclic structure.

It is especially preferred that the cyclic olefin monomer unit be at least one member selected from cyclic olefin monomer units having a 6-membered carbocyclic structure.

Examples of cyclic olefin monomer units include monomer units having a cyclopentane skeleton, a cyclohexane skeleton and a cyclooctane skeleton, respectively. Of these, a monomer unit having a cyclohexane skeleton is especially preferred.

In the present invention, with respect to the polymer containing a cyclic olefin monomer unit in its main chain, it is preferred that the cyclic olefin monomer unit is a monomer unit represented by the following formula (II):

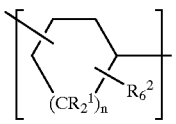

(II)

wherein n is an integer of from 1 to 4, each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group, or a 5 to 10-membered heterocyclic group having at least one nitrogen, oxygen or sulfur atom as a heteroatom, or each $R^2$ independently represents a bond or a group such that two $R^2$ groups together form a bridge represented by the formula —$(CR_2^3)_m$— in which $R^3$ has the same meaning as defined for $R^1$ and m is an integer of from 1 to 10. It is most preferred that the cyclic olefin monomer unit is a monomer unit represented by the following formula (IV):

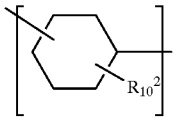

(IV)

wherein each $R^2$ is as defined for formula (II).

In the cyclic olefin monomer unit-containing polymer used in the present invention, there is no particular limitation with respect to the content of the cyclic olefin monomer unit, and the content may vary depending on the intended use of the curable resin of the present invention. However, the content is generally within the range of from 0.001 to 100 wt %, preferably from 0.01 to 100 wt %, more preferably from 0.1 to 100 wt %.

Further, for obtaining the curable resin of the present invention which can be used in a field where the resin is required to have high thermal and mechanical properties, or when the resin is used as a functional material, it is recommended that the content of the cyclic olefin monomer unit in the polymer is within the range of from 1 to 100 wt %, more preferably from 2 to 100 wt %, most preferably from 5 to 100 wt %.

Examples of cyclic olefin monomers which can be converted to the above-mentioned cyclic olefin monomer units include cyclopentene, cyclohexene, cyclooctene and derivatives thereof.

There is no particular limitation with respect to a method for producing the cyclic monomer unit-containing polymer used in the present invention, as long as the polymer contains the above-mentioned cyclic olefin monomer unit and/or the above-mentioned cyclic conjugated diene monomer unit.

Further, in the present invention, there is no particular limitation with respect to a method for producing a polymeric molecular chain containing a cyclic olefin monomer unit.

For example, the polymeric molecular chain containing a cyclic olefin monomer unit can be produced by a method in which a cyclic conjugated diene monomer, such as 1,3-cyclopentadiene, 1,3-cyclohexadiene or 1,3-cyclooctadiene, is polymerized to obtain a cyclic conjugated diene polymer, and the carbon-to-carbon double bonds in a part of the cyclic conjugated diene monomer units contained in the polymer are hydrogenated to thereby convert the cyclic conjugated diene monomer units to the cyclic olefin monomer units.

In the present invention, the cyclic conjugated diene monomer unit is at least one member selected from cyclic conjugated diene monomer units having carbocyclic structures.

In the present invention, the term "cyclic conjugated diene monomer" means a cyclic conjugated diene having an at least-5-membered carbocyclic structure.

It is preferred that the cyclic conjugated diene monomer unit is at least one member selected from cyclic conjugated diene monomer units having 5 to 8-membered carbocyclic structures.

It is especially preferred that the cyclic conjugated diene monomer unit is at least one member selected from cyclic conjugated diene monomer units having a 6-membered carbocyclic structure.

Illustrative examples of cyclic conjugated diene monomers include 1,3-cyclopentadiene, 1,3-cyclohexadiene, 1,3-cyclooctadiene, and derivatives thereof. Preferred examples of cyclic conjugated diene monomers include 1,3-cyclohexadiene and 1,3-cyclohexadiene derivatives. Of these, 1,3-cyclohexadiene is most preferred.

In the present invention, the number average molecular weight ($\overline{Mn}$) is measured by gel permeation chromatography, using a calibration curve obtained with respect to standard polystyrene samples.

The cyclic monomer unit-containing polymer having a reactive group, which is used in the curable resin of the present invention, has a number average molecular weight within the range of from 1,000 to 5,000,000. The number average molecular weight can be appropriately selected within the above-mentioned range, depending on the intended use of the curable resin. For example, when the curable resin is used as an industrial material for structural parts and the like, it is recommended that the number average molecular weight of the polymer is within the range of from 10,000 to 5,000,000. From the viewpoint of productivity in the commercial scale production of the polymer, it is recommended that the number average molecular weight of the polymer is within the range of from 15,000 to 5,000,000, preferably within the range of from 20,000 to 3,000,000, more preferably from 25,000 to 2,000,000, still more preferably from 30,000 to 1,000,000. The most preferred range is from 40,000 to 500,000. When the curable resin is used in a field, such as construction or civil engineering, where the resin is required to have plasticity, adhesive properties and compatibility with inorganic substances, it is recommended that the number average molecular weight of the polymer is within the range of from 1,000 to 50,000.

When the number average molecular weight of the polymer is less than 1,000, the polymer is likely to be a markedly brittle solid substance or a viscous liquid, so that the commercial value of the curable resin comprising such a polymer as an industrial material becomes extremely low.

On the other hand, when the number average molecular weight of the polymer is more than 5,000,000, the polymer is disadvantageous in various aspects from a commercial viewpoint. For example, a polymer having such a high molecular weight has disadvantages in that a prolonged period of time is needed for the polymerization reaction, and the melt viscosity of the polymer obtained becomes high.

In the present invention, the $\overline{Mw}/\overline{Mn}$ value (criterion of the molecular weight distribution) (wherein $\overline{Mw}$ represents the weight average molecular weight and $\overline{Mn}$ is as defined above) of the polymer is within the range of from 1.01 to 10, preferably from 1.03 to 7.0, most preferably from 1.05 to 5.0.

In the present invention, as examples of comonomers copolymerizable with the cyclic conjugated diene monomer, there can be mentioned monomers which can be polymerized by anionic polymerization.

Examples of such monomers include chain conjugated diene monomers, such as 1,3-butadiene, isoprene, 2,3-dimethyl-1,3-butadiene, 1,3-pentadiene, 1,3-hexadiene; vinyl aromatic monomers, such as styrene, α-methylstyrene, o-methylstyrene, p-methylstyrene, p-tert-butyl-styrene, 1,3-dimethylstyrene, divinylbenzene, vinylnaphthalene, diphenylethylene, vinylpyridine; polar vinyl monomers, such as acrylonitrile; polar monomers, such as ethylene oxide, propylene oxide, lactone, lactam and cyclosiloxane; ethylene monomer; and α-olefin monomers. These monomers can be used individually or in combination.

In the present invention, a reactive group-containing copolymer of the cyclic conjugated diene monomer with the above-mentioned comonomer may possess any configuration.

For example, the copolymer may be a block copolymer, such as a diblock, a triblock, a tetrablock, a multiblock or a radial block copolymer, a graft copolymer, a taper copolymer, a random copolymer or an alternating copolymer.

In the cyclic monomer unit-containing polymer having a reactive group, the monomer unit derived from at least one comonomer copolymerizable with the cyclic conjugated diene monomer may be a monomer unit which is formed by a post-polymerization treatment, such as hydrogenation or the like.

In the cyclic monomer unit-containing polymer having a reactive group, the content of the cyclic conjugated diene monomer unit is not particularly limited and may vary depending on the intended use of the curable resin. However, the content of the cyclic conjugated diene monomer unit is generally within the range of from 0.1 to 100 wt %, preferably from 0.5 to 100 wt %, more preferably from 1 to 100 wt %.

In the present invention, with respect to the cyclic monomer unit-containing polymer having a reactive group, for controlling the molecular weight of the polymer or for obtaining the polymer in the form of a star shaped polymer, a configuration can be assumed such that the terminals of a plurality of polymer chains are bonded together using a conventional at least-bi-functional coupling agent, such as trichlorosilane, methyldichlorosilane, methylchlorosilane, dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester.

When the cyclic monomer unit-containing polymer having a reactive group is a block copolymer, the block copolymer may contain various polymer blocks. Examples of polymer blocks contained in the block copolymer include a polymer block comprised of monomer units derived solely from at least one type of cyclic conjugated diene monomer, a polymer block comprised of monomer units respectively derived from at least one type of cyclic conjugated diene monomer and derived from at least one comonomer copolymerizable with the cyclic conjugated diene monomer, and a polymer block comprised of monomer units derived solely from at least one comonomer copolymerizable with a cyclic conjugated diene monomer. For attaining various purposes, various types of polymer blocks can be designed and produced by polymerization. By appropriately choosing and bonding such polymer blocks, a cyclic monomer unit-containing block copolymer having a reactive group, which has suitable properties for the intended use, can be obtained.

When a part or all of a polymer block in the block polymer is comprised of cyclic conjugated diene monomer units, it is recommended that the polymer block contains a contiguous arrangement of at least 10 such monomer units, preferably 20 or more such monomer units, more preferably 30 or more such monomer units, from the viewpoint of obtaining a block copolymer having excellent thermal and mechanical properties.

As the method of producing the cyclic monomer unit-containing block copolymer having a reactive group, there can be mentioned, for example, a method which comprises: preparing various types of block unit polymers, namely, a block unit polymer comprised of monomer units derived solely from at least one type of cyclic conjugated diene monomer, a block unit polymer comprised of monomer units respectively derived from at least one type of cyclic conjugated diene monomer and derived from at least one comonomer copolymerizable with the cyclic conjugated diene monomer, and a block unit polymer comprised of monomer units derived solely from at least one comonomer copolymerizable with a cyclic conjugated diene monomer; choosing an appropriate combination of these block unit polymers; and polymerization-bonding the combination of block unit polymers together.

For example, one mode of the method comprises the steps of forming by polymerization a block unit polymer containing a monomer unit derived from at least one type of cyclic conjugated diene monomer, or a block unit polymer comprised solely of monomer units derived from the cyclic conjugated diene monomer; and polymerizing the block unit polymer with at least one type of comonomer copolymerizable with the cyclic conjugated diene monomer, wherein the comonomer is successively bonded to one or both terminals of the block unit polymer by polymerization.

Another mode of the method comprises the steps of polymerizing at least one type of comonomer copolymerizable with a cyclic conjugated diene monomer to obtain a block unit polymer; and polymerizing the block unit polymer with at least one type of cyclic conjugated diene monomer, and optionally with at least one type of comonomer copolymerizable with the cyclic conjugated diene monomer, wherein the cyclic conjugated diene monomer and the optional comonomer are successively bonded to one or both terminals of the block unit polymer by polymerization.

A further mode of the method comprises the steps of forming by polymerization a block unit polymer containing a monomer unit derived from at least one type of cyclic conjugated diene monomer, or a block unit polymer comprised solely of monomer units derived from the cyclic conjugated diene monomer; polymerizing the block unit polymer with at least one type of comonomer copolymerizable with the cyclic conjugated diene monomer to obtain a polymer; and successively bonding to the polymer by polymerization a block unit polymer containing a monomer unit derived from at least one cyclic conjugated diene monomer or a block unit polymer comprised solely of monomer units derived from the cyclic conjugated diene monomer.

Still a further mode of the method comprises the steps of polymerizing at least one type of comonomer copolymerizable with the cyclic conjugated diene monomer to obtain a block unit polymer; polymerizing the block unit polymer with a block unit polymer containing a monomer unit derived from at least one cyclic conjugated diene monomer or a block unit polymer comprised solely of monomer units derived from the cyclic conjugated diene monomer; and successively bonding to the resultant polymer by polymerization at least one type of comonomer copolymerizable with the cyclic conjugated diene monomer.

Still a further mode of the method comprises the steps of forming by polymerization a block unit polymer containing a monomer unit derived from at least one cyclic conjugated diene monomer or a block unit polymer comprised solely of monomer units derived from the cyclic conjugated diene monomer; polymerizing the block unit polymer with at least one type of comonomer copolymerizable with the cyclic conjugated diene monomer to obtain a polymer; and bonding the terminals of the molecular chain of the polymer together using a conventional at least-bi-functional coupling agent (such as trichlorosilane, methyldichlorosilane, dimethylchlorosilane, dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester).

Still a further mode of the method comprises the steps of forming by polymerization a block unit polymer containing a monomer unit derived from at least one cyclic conjugated diene monomer or a block unit polymer comprised solely of monomer units derived from the cyclic conjugated diene monomer; introducing a functional group to one or both terminals of the block unit polymer using a terminal modifier (e.g., ethylene oxide, propylene oxide, cyclohexene oxide, $CO_2$, acid chloride or the like), to obtain a functional block unit polymer; and bonding the obtained functional block unit polymer to another polymer having a functional group which can be bonded to the functional group of the above functional block unit polymer.

Still a further mode of the method comprises the steps of forming by polymerization a block unit polymer containing a monomer unit derived from at least one cyclic conjugated diene monomer or a block unit polymer comprised solely of monomer units derived from the cyclic conjugated diene monomer; polymerizing the block unit polymer with at least one type of comonomer copolymerizable with the cyclic conjugated diene monomer to obtain a polymer; introducing a functional group to one or both terminals of the thus obtained polymer using a terminal modifier (e.g., ethylene oxide, propylene oxide, cyclohexene oxide, $CO_2$, acid chloride or the like) to obtain a functional polymer; and bonding the obtained functional polymer to another polymer having a functional group which can be bonded to the functional group of the above functional block unit polymer.

Still a further mode of the method comprises polymerizing at least one type of cyclic conjugated diene monomer with at least one type of comonomer copolymerizable with the cyclic conjugated diene monomer, wherein the at least one comonomer has a different polymerization rate from that of the cyclic conjugated diene monomer, to thereby obtain a taper block copolymer.

Still a further mode of the method comprises polymerizing a cyclic conjugated diene monomer and at least one type of comonomer copolymerizable with the cyclic conjugated diene monomer, wherein the ratio of the cyclic conjugated diene monomer to the at least one comonomer is not unity.

Still a further mode of the method comprises the steps of forming by polymerization a block unit polymer comprised of monomer units derived from the cyclic conjugated diene monomer, wherein the polymerization is conducted until a desired certain conversion is achieved; polymerizing the block unit polymer with at least one type of comonomer, which is copolymerizable with and different in polymerization rate from the cyclic conjugated diene monomer, to thereby obtain a block copolymer.

In the present invention, the block unit polymer comprised of a monomer unit derived from at least one type of cyclic conjugated diene monomer unit may further comprise a monomer unit derived from at least one comonomer copolymerizable with the cyclic conjugated diene monomer.

Further, in the present invention, the block unit polymer comprised of a monomer unit derived from at least one comonomer copolymerizable with the cyclic conjugated diene monomer may further comprise a monomer unit derived from at least one cyclic conjugated diene monomer.

In the present invention, with respect to the monomer unit derived from at least one type of cyclic conjugated diene monomer, and the polymer block containing such a monomer unit, it is most preferred that such a monomer unit comprises a cyclohexane ring.

In the cyclic conjugated diene polymer which is most preferably used in the production of the cyclic monomer unit-containing polymer having a reactive group, with respect to the monomer units derived from the cyclic conjugated diene monomer, which are contained so as to constitute a part or whole of the main chain of the polymer, preferred examples thereof are those which are represented by the following formula (III), and most preferred examples thereof are those which are represented by the following formula (V):

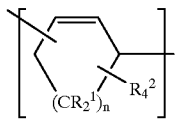

(III)

wherein each of $R^1$ and $R^2$ is as defined for formula (II), and wherein the carbon-to-carbon double bond is not hydrogenated; and

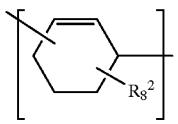

(V)

wherein each $R^2$ is as defined for formula (II), and wherein the carbon-to-carbon double bond is not hydrogenated.

In the present invention, for obtaining a cyclic monomer unit-containing block copolymer having a reactive group or a saturated cyclic molecule-containing block copolymer obtained by subjecting the cyclic monomer-containing block copolymer having a reactive group to an addition reaction, which can be used as a thermoplastic elastomer or a special transparent resin having high impact resistance, it is necessary that the block copolymer be comprised of at least two polymer blocks serving as agglomeration phases (i.e., hard segments) and at least one polymer block serving as an elastomer phase (i.e., soft segments), and that these two types of blocks form a microdomain structure.

In the polymeric molecular chain of such a block copolymer, the agglomeration phase functions as a physical crosslinking site at a temperature lower than a glass transition temperature (Tg) of the agglomeration phase so that the block copolymer has elastomeric properties (rubber elasticity). On the other hand, at Tg or a temperature higher than Tg, the agglomeration phase becomes fluid, so that the block copolymer is imparted with flowability. Therefore, in this case, it becomes possible to perform an injection molding, and to recycle the block copolymer.

In the present invention, when employing the most preferred polymerization method, i.e., living anionic polymerization, it is possible to obtain a cyclic conjugated diene monomer unit-containing block copolymer, which comprises at least two block units (hereinafter, frequently referred to as "X blocks") each comprised mainly of a cyclic conjugated diene monomer unit or a derivative thereof, or comprised of a cyclic conjugated diene monomer unit and a vinyl aromatic monomer unit, and at least one block unit (hereinafter, frequently referred to as a "Y block") comprised mainly of a chain conjugated diene monomer or a derivative thereof. Then, by subjecting the obtained block copolymer to an addition reaction, a block copolymer having a cyclic olefin monomer unit can be obtained.

For example, by the above-mentioned living anionic polymerization, it is possible to obtain a cyclic monomer unit-containing block copolymer, which has elastomeric properties (rubber elasticity), such as a thermoplastic elastomer or a special transparent resin having high impact resistance. Examples of such block copolymers include linear block copolymers respectively represented by the formulae (VI), radial block copolymers respectively represented by the formulae (VII) and addition reaction products thereof:

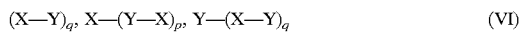
(VI)

wherein p is an integer of 1 or more, and q is an integer of 2 or more; and

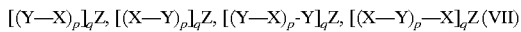
(VII)

wherein p is an integer of 1 or more, and q is an integer of 2 or more; and each Z independently represents a group of a multi-functional coupling agent, such as dimethyldichlorosilane, methylene chloride, silicon tetrachloride, tin tetrachloride or an epoxidized soybean oil, or a group of a polymerization initiator, such as a multi-functional organometallic compound containing a metal belonging to Group IA of the Periodic Table.

In the present invention, when the cyclic olefin monomer unit-containing polymer has carbon-to-carbon unsaturated bonds remaining intact, the unsaturated bonds in the polymer may be hydrogenated so as to achieve an appropriately selected hydrogenation degree, depending on the intended use of the curable resin.

There is no particular limitation with respect to the polymerization method for producing a cyclic conjugated diene polymer which is most preferably used in the present invention for producing a cyclic monomer unit-containing polymer having a reactive group, and any conventional polymerization method can be used as long as a cyclic conjugated diene polymer satisfying the requirements of the present invention. However, the most preferable polymerization method for obtaining a cyclic conjugated diene polymer is a living anionic polymerization using, as a polymerization catalyst, a complex prepared by reacting at least one organometallic compound containing a metal belonging to Group IA (Group IA metal) with an amine as a complexing agent to obtain a cyclic conjugated diene polymer having a desired molecular weight and a desired polymer structure.

Examples of metals belonging to Group IA which can be used in the most preferred polymerization method to be employed in the present invention include lithium, sodium, potassium, rubidium, cesium and francium. Among these, lithium, sodium and potassium are preferred. Of these, lithium is especially preferred.

In the present invention, as mentioned above, the complex as a polymerization catalyst to be used in the polymerization is a complex prepared by reacting at least one organometallic compound containing a Group IA metal with an amine. Especially preferred examples of complexes include complexes each prepared by reacting an organolithium compound, an organosodium compound, or an organopotassium compound with an amine.

The most preferred complex is a complex prepared by reacting an organolithium compound with an amine.

The organolithium compound, which can be preferably used in the polymerization catalyst that is used in the above-mentioned polymerization method, is an organic compound having a structure such that at least one lithium atom is bonded to an organic molecule containing at least one carbon atom or an organic polymer having a structure such that at least one lithium atom is bonded to an organic polymer.

Examples of such an organic molecule include a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, and a $C_4$–$C_{20}$ cyclodienyl group.

Examples of organolithium compounds usable in the polymerization method that is used in the present invention include methyllithium, ethyllithium, n-propyllithium, isopropyllithium, n-butyllithium, sec-butyllithium, tert-butyllithium, pentyllithium, hexyllithium, aryllithium, cyclohexyllithium, phenyllithium, hexamethylenedilithium, cyclopentadienyllithium, indenyllithium, butadienyldilithium, and isoprenyldilithium. Further, known oligomeric or polymeric organolithium compounds, each containing a lithium atom in a polymeric molecular chain thereof, such as polybutadienyllithium, polyisoprenyllithium and polystyryllithium, can also be used.

As a preferred organolithium compound, there is no particular limitation with respect to the type thereof as long as it forms a stable complex (compound). However, representative examples of such organolithium compounds include methyllithium, ethyllithium, n-propyllithium, isopropyllithium, n-butyllithium, sec-butyllithium, tert-butyllithium, and cyclohexyllithium.

Of these, n-butyllithium (n-BuLi) is most preferred from an industrial point of view.

The organometallic compounds containing a Group IA metal usable in the above-mentioned polymerization method can be used individually or, if desired, in combination.

As regards the catalyst to be used in the above-mentioned polymerization method, one or more types of amine are used as complexing agents for forming a complex of an organometallic compound containing a Group IA metal.

More specifically, examples of amines as complexing agents include an organic amine or an organic polymeric amine, which contains at least one $R^1R^2N$-group (wherein each of $R^1$ and $R^2$ independently represents an alkyl group, an aryl group, or a hydrogen atom) which is a polar group having a non-covalent electron pair capable of coordinating to the organometallic compound containing a Group IA metal to thereby form a complex.

Among these amines, a tert-amine is most preferred.

Preferred examples of tert-amines usable in the present invention include trimethylamine, triethylamine, dimethylaniline, diethylaniline, tetramethyldiaminomethane, tetramethylethylenediamine, tetramethyl-1,3-propanediamine, tetramethyl-1,3-butanediamine, tetramethyl-1,4-butanediamine, tetramethyl-1,6-hexanediamine, tetramethyl-1,4-phenylenediamine, tetramethyl-1,8-naphthalenediamine, tetramethylbenzidine, tetraethylethylenediamine, tetraethyl-1,3-propanediamine, tetramethyldiethylenetriamine, tetraethyldiethylenetriamine, pentamethyldiethylenetriamine, pentaethyldiethylenetriamine, diazabicyclo[2.2.2]octane, 1,5-diazabicyclo[4.3.0]-5-nonene, 1,8-diazabicyclo[5.4.0]-7-undecene, 1,4,8,11-tetramethyl-1,4,8,11-tetraazacyclotetradecane, tetrakis(dimethylamino)ethylene, tetraethyl-2-butene-1,4-diamine, and hexamethylphosphoric triamide.

More preferred examples of amines usable in the present invention include aliphatic amines, and aliphatic diamines are especially preferred.

Especially preferred examples of aliphatic diamines include tetramethylmethylenediamine (TMMDA), tetraethylmethylenediamine (TEMDA), tetramethylethylenediamine (TMEDA), tetraethylethylenediamine (TEEDA), tetramethylpropylenediamine (TMPDA), tetraethylpropylenediamine (TEPDA), tetramethylbutylenediamine (TMBDA), tetraethylbutylenediamine (TEBDA), tetramethylpentanediamine, tetraethylpentanediamine, tetramethylhexanediamine (TMHDA), tetraethylhexanediamine (TEHDA), and diazabicyclo[2.2.2]octane (DABCO).

From an industrial point of view, the most preferred aliphatic diamine compounds usable in the present invention include aliphatic diamines capable of reacting with organolithium compounds to form stable complexes. Of these aliphatic diamines, aliphatic diamines having 1 to 6 carbon atoms between the nitrogen atoms in an amine molecule is preferred. More preferred are those having 1 to 3 carbon atoms between the nitrogen atoms. Most preferred are those having 2 carbon atoms between the nitrogen atoms.

A most preferred specific example of an aliphatic diamine usable in the present invention includes tetramethylethylenediamine (TMEDA).

The above-mentioned amines as complexing agents may be used individually or, if desired, in combination.

In the present invention, it is preferred that the polymerization catalyst is one which is prepared from an organometallic compound containing at least one Group IA metal and at least one amine, which can form a complex which is stable at room temperature.

It is especially preferred that the catalyst is one which is prepared from n-butyllithium (n-BuLi) and at least one amine selected from the group consisting of tetramethylmethylenediamine (TMMDA), tetramethylethylenediamine (TMEDA), tetramethylpropylenediamine (TMPDA), and diazabicyclo[2.2.2]octane (DABCO).

It is most preferred that the catalyst is one which is prepared from n-butyllithium (n-BuLi) and tetramethylethylenediamine (TMEDA). Such a catalyst is a white or colorless crystalline complex which is stable at room temperature and, hence, is the most preferred polymerization catalyst to be used in the polymerization method employed in the present invention.

In the above-mentioned polymerization method, it is preferred that, prior to the polymerization reaction, a complex is prepared by reacting an organometallic compound containing a Group IA metal with at least one amine as a complexing agent, and the prepared complex is used as a polymerization catalyst.

In the present invention, there is no particular limitation with respect to the method for preparing a complex as a polymerization catalyst. The preparation can be conducted by a conventional method.

Examples of such conventional methods include a method comprising dissolving the organometallic compound containing a Group IA metal in an organic solvent in an atmosphere of a dried inert gas, and adding thereto a solution of an amine; and a method comprising dissolving an amine in an organic solvent in an atmosphere of a dried inert gas, and adding thereto a solution of the organometallic compound containing a Group IA metal. From these methods, a preferred method can be appropriately selected.

It is preferred that the above-mentioned organic solvent is appropriately selected depending on the type and amount of the organometallic compound and the type and amount of an amine, and is well deaerated and dried prior to use.

The reaction for obtaining the complex of at least one organometallic compound with at least one amine is generally conducted at −100 to 100° C.

Examples of inert gases to be used in the preparation of a complex include helium, nitrogen and argon. Of these, nitrogen and argon are preferred from the industrial point of view.

In the preparation of a complex from a Group IA metal-containing organometallic compound and an amine as a complexing agent, which complex is used as a catalyst in the above-mentioned most preferred polymerization method for producing a cyclic monomer unit-containing polymer, it is most preferred to employ the following molar ratio with respect to the amine and the Group IA metal contained in the organometallic compound. The molar ratio is:

generally:
   A/B=1,000/1 to 1/1,000,
preferably:
   A/B=500/1 to 1/500,
more preferably:
   A/B=100/1 to 1/100, still more preferably:
A/B=50/1 to 1/50,
most preferably:
A/B=20/1 to 1/20,
wherein A is the molar amount of the amine (amine compound molecule), and B is the molar amount of the Group IA metal contained in the organometallic compound.

When the above-mentioned molar ratio A/B is within the range as defined above, a stable complex can be obtained in high yield, which can be advantageously used for producing a cyclic conjugated diene polymer having a narrow molecular weight distribution.

When the molar ratio A/B is outside the range as defined above, various disadvantages are likely to be caused such that the production process for the complex becomes costly, and that the complex becomes unstable, so that concurrently with the polymerization reaction, undesirable side reactions, such as a transfer reaction and a Group IA metal hydride elimination reaction, are likely to occur.

In the present invention, it is especially preferred that the polymerization catalyst is one prepared by a method in which an organometallic compound containing a Group IA metal is reacted with an amine as a complexing agent to thereby obtain a reaction mixture containing a complex, and an unreacted organometallic compound containing a Group IA metal is removed from the reaction mixture prior to the polymerization reaction.

When an unreacted organometallic compound is present in a polymerization reaction system, side reactions (such as a transfer reaction and a Group IA metal hydride elimination reaction) occur concurrently with the polymerization reaction. In this case, disadvantages are likely to be caused such that the molecular weight distribution of the resultant cyclic conjugated diene polymer becomes unfavorably broad, and that it becomes difficult to obtain a block copolymer.

The polymerization method to be employed in the present invention is not specifically limited, and can be conducted by vapor phase polymerization, bulk polymerization or solution polymerization.

The polymerization reaction can be conducted in a batchwise, a semibatchwise or a continuous manner.

Examples of polymerization solvents to be used in the solution polymerization reaction include aliphatic hydrocarbons, such as butane, n-pentane, n-hexane, n-heptane, n-octane, iso-octane, n-nonane and n-decane; alicyclic hydrocarbons, such as cyclopentane, methylcyclopentane, cyclohexane, methylcyclohexane, ethylcyclo-hexane, cycloheptane, cyclooctane, decalin and norbornane; aromatic hydrocarbons, such as benzene, toluene, xylene, ethylbenzene and cumene; and ethers, such as diethyl ether and tetrahydrofuran.

These polymerization solvents may be used individually or, if desired, in combination.

Preferred polymerization solvents are aliphatic hydrocarbons, alicyclic hydrocarbons and aromatic hydrocarbons.

More preferred polymerization solvents are aliphatic hydrocarbons, alicyclic hydrocarbons and mixtures thereof.

Most preferred polymerization solvents are n-hexane, cyclohexane and mixtures thereof.

In the polymerization method for producing a cyclic conjugated diene polymer, the amount of the polymerization catalyst is not specifically limited, and may vary depending on the intended use of the curable resin. However, the polymerization catalyst is generally used in an amount of from $1 \times 10^{-6}$ mol to $1 \times 10^{-1}$ mol, preferably from $5 \times 10^{-6}$ mol to $5 \times 10^{-2}$ mol, in terms of the molar amount of metal atom per mol of the monomer or monomers.

In the polymerization method, the polymerization reaction temperature can be appropriately selected. However, the polymerization reaction temperature is generally from $-100$ to $150°$ C., preferably from $-80$ to $120°$ C., more preferably from $-30$ to $110°$ C., most preferably from 0 to $100°$ C. From an industrial point of view, it is advantageous to control the polymerization reaction temperature within the range of from room temperature to $90°$ C.

In the polymerization method, the polymerization reaction time is not specifically limited, and may vary depending on the intended use of the curable resin and other polymerization reaction conditions. However, the polymerization reaction time is generally not longer than 48 hours, preferably from 1 to 10 hours.

In the polymerization method, it is preferred that the polymerization reaction is conducted in an atmosphere of an inert gas, such as nitrogen, argon or helium. It is especially preferred that such an inert gas is used after being well dried.

With respect to the pressure in the polymerization reaction system, there is no particular limitation, and a widely varied pressure can be chosen as long as the pressure is sufficient to maintain the monomer or monomers and the solvent at a liquid state at a polymerization temperature within the above-mentioned range. Further, care must be taken to prevent the intrusion of impurities, which deactivate the polymerization catalyst or the active terminals of the polymer being formed, such as water, oxygen and carbon dioxide, into the polymerization reaction system.

In the polymerization method for producing a cyclic monomer unit-containing polymer, the above-mentioned polymerization catalysts may be used individually or, if desired, in combination.

In the polymerization method, when a predetermined polymerization degree has been reached, conventional additives may be added to the polymerization reaction system. Examples of such conventional additives include a terminal modifier, such as a halogen gas, carbon dioxide, carbon monoxide, an alkylene oxide, an alkylene sulfide, an isocyanate compound, an imino compound, an aldehyde compound, a ketone compound, a thioketone compound, an ester, a lactone, an amide group-containing compound, a urea compound or an acid anhydride; a terminal-branching agent, such as a polyepoxide, a polyisocyanate, a polyimine, a polyaldehyde, a polyanhydride, a polyester, a polyhalide or a metal halide; a coupling agent, such as trichlorosilane, methyldichlorosilane, dimethylchlorosinane, dimethyldichlorosilane, methyltrichlorosilane, dimethyldibromosilane, methyltribromosilane, titanocene dichloride, zirconocene dichloride, methylene chloride, methylene bromide, chloroform, carbon tetrachloride, silicon tetrachloride, titanium tetrachloride, tin tetrachloride, an epoxidized soybean oil or an ester; a polymerization terminator; a polymerization stabilizer; and a stabilizing agent, such as a heat stabilizer, an antioxidant or an ultraviolet absorber.

In the polymerization method, conventional heat stabilizers, antioxidants and ultraviolet absorbers can be used.

For example, heat stabilizers, antioxidants and ultraviolet absorbers of phenol type, organic phosphate type, organic phosphite type, organic amine type and organic sulfur type can be used.

The amount of each of the heat stabilizer, antioxidant and ultraviolet absorber to be added is generally from 0.001 to 10 parts by weight, relative to 100 parts by weight of the cyclic monomer unit-containing polymer.

With respect to the polymerization terminator, any conventional polymerization terminator can be used as long as it can deactivate the polymerization activating species of the polymerization catalyst. Preferred examples of polymerization terminators include water, a $C_1$–$C_{10}$ alcohol, a ketone, a polyhydric alcohol (such as ethylene glycol, propylene glycol, or glycerol), a phenol, a carboxylic acid, and a halogenated hydrocarbon.

The amount of polymerization terminator to be added is generally within the range of from 0.001 to 10 parts by weight, relative to 100 parts by weight of the cyclic monomer unit-containing polymer. The polymerization terminator may be added before or simultaneously with the addition of a heat stabilizer, an antioxidant and/or an ultraviolet absorber. Alternatively, the active terminals of the polymer may be deactivated by contacting the active terminals with molecular hydrogen.

One example of the most preferred method for obtaining a cyclic monomer unit-containing polymer having a reactive group comprises polymerizing a cyclic conjugated diene monomer in the presence of a polymerization catalyst to thereby obtain a polymer; if desired, subjecting the obtained polymer to hydrogenation; and subjecting the obtained polymer or the resultant hydrogenated polymer to addition reaction with a reactive group, e.g., a hydrocarbon group substituted with a functional group.

In this instance, a desired cyclic monomer unit-containing polymer having a reactive group can be obtained by subjecting a cyclic conjugated diene polymer to addition reaction with a reactive group (e.g., a hydrocarbon group substituted with a functional group) after a predetermined polymerization degree has been reached in the polymerization reaction conducted in the presence of a polymerization catalyst for obtaining the cyclic conjugated diene polymer; and, if desired, the resultant cyclic conjugated diene polymer having the reactive group is hydrogenated.

For performing the addition reaction, the following methods can be mentioned:

a batchwise method which comprises stopping the polymerization reaction by deactivating the polymerization catalyst, and conducting an addition reaction in the same reactor as used in the polymerization reaction to thereby obtain a polymer having a reactive group;

a semi-batchwise method which comprises stopping the polymerization reaction by deactivating the polymerization catalyst to thereby obtain a polymer solution, transferring the obtained polymer solution to a reactor other than that used in the polymerization reaction, and conducting an addition reaction in the reactor to thereby obtain a polymer having a reactive group; and a continuous method which comprises continuously conducting the polymerization reaction and an addition reaction in a tubular reactor to thereby obtain a polymer having a reactive group.

From the above-mentioned methods, a desirable method can be appropriately selected.

In the present invention, the term "reactive group" means a functional group or a functional group-containing group, which is capable of forming a crosslinked structure by itself, or in cooperation with a crosslinking agent (Z) or other components of the cyclic monomer unit-containing polymer, by ① UV irradiation, ② electron beam irradiation, ③ a reaction with an inorganic compound, ④ reaction with water, ⑤ other chemical reactions (such as a transesterification, a hydrazone-forming reaction, a hydrazide-forming reaction, an oxime-forming reaction and an ammonium salt-forming reaction).

Specific examples of reactive groups include functional groups, such as a $C_4$–$C_{20}$ cyclodienyl group, a thiol group, a carboxyl group, an acid anhydride-containing group, a hydrazinocarbonyl group, an amino group, a hydroxyl group, an epoxy group, an imino group, an isocyanate group, a sulfonic acid group, an ester group, a silyl group, a siloxy group, a vinyl group, a methylol group, an oxazoline group, a silanol group, a silyl ether group, a silyl ester group, an ether group (an epoxy group and the like), a carbonyl group, a formyloxy group, an imido group, an acetoxy group, an alkoxysilane group and an oxazoline group; a hydrocarbon group substituted with the above-mentioned functional group, which hydrocarbon group is selected from the group consisting of a $C_1$–$C_{20}$ alkyl group, a $C_2$–$C_{20}$ unsaturated aliphatic hydrocarbon group, $C_3$–$C_{20}$ cycloalkyl group, a $C_5$–$C_{20}$ aryl group and a $C_4$–$C_{20}$ cyclodienyl group; an organic compound group containing the above-mentioned functional group or the above-mentioned hydrocarbon group substituted with the functional group.

Preferred examples of reactive groups include functional groups, such as a silyl group, a siloxy group, a silanol group and a silyl ether group, a silyl ester group, an epoxy group, a vinyl group; a hydrocarbon group substituted with the above-mentioned functional group, which hydrocarbon group is selected from the group consisting of a $C_1$–$C_{20}$ alkyl group, a $C_2$–$C_{20}$ unsaturated aliphatic hydrocarbon group, $C_3$–$C_{20}$ cycloalkyl group, a $C_5$–$C_{20}$ aryl group and a $C_4$–$C_{20}$ cyclodienyl group; and an organic compound group containing the above-mentioned functional group or the above-mentioned hydrocarbon group substituted with the functional group.

The cyclic monomer unit-containing polymer having a reactive group can be produced by adding the above-mentioned reactive group to the cyclic monomer unit-containing polymer by a conventional addition reaction using a conventional reactive reagent.

Examples of conventional addition reactions include an oxidation reaction, a hydration reaction, an amino-forming reaction, an epoxy-forming reaction, a halohydrin-forming reaction, a silyl-forming reaction, a carbonyl-forming reaction (through either oxidation or reduction), a dehydration reaction, a dehydrohalogenation reaction, an imino-forming reaction, a radical addition reaction (through the formation of either a radical anion or a radical cation), and an acetal-forming reaction, a carboxyl-forming reaction. These reactions can be employed individually or in combination.

Representative examples of reactive reagents which can be used to bond the reactive group to the cyclic monomer unit-containing polymer by an addition reaction include the following compounds.

(i) Unsaturated carboxylic acids and derivatives thereof

Specific examples of unsaturated carboxylic acids and derivatives thereof (such as esters, anhydrides, metal salts, amides, imides and acid halides) include acrylic acid, methacrylic acid, maleic acid, itaconic acid, citraconic acid, fumaric acid, Hi-mic acid, crotonic acid, mesaconic acid, sorbic acid, maleic acid, itaconic acid, citraconic acid, fumaric acid, Himic acid, crotonic acid, mesaconic acid, sorbic acid, tetrahydrophthalic acid, methyltetrahydro-phthalic acid, endocis-bicyclo[2.2.1]hepto-5-ene-2,3-dicarboxylic acid (Nadic Acid®), methyl-endocis-bicyclo [2.2.1]hepto-5-ene-2,3-dicarboxylic acid (Methylnadic Acid®), a metal salt of (meth)acrylic acid, methyl (meth) acrylate, ethyl (meth)acrylate, dimethyl maleate, diethyl maleate, dimethyl succinate, diethyl succinate, dimethyl fumarate, diethyl fumarate, maleic anhydride, trimellitic anhydride, pyromellitic anhydride, succinic anhydride, itaconic anhydride, citraconic anhydride, fumaric anhydride, Hi-mic acid anhydride, crotonic anhydride, mesaconic anhydride, sorbic anhydride, tetrahydrophthalic anhydride, methyl tetrahydrophthalic anhydride, maleimide, succinimide, phthalimide, (meth)acrylic acid chloride, (meth)acrylic acid bromide, (meth)acrylic acid iodide, maleic acid chloride, itaconic acid chloride, citraconic acid chloride, fumaric acid chloride, Hi-mic acid chloride, crotonic acid chloride, mesaconic acid chloride, sorbic acid chloride, maleic acid bromide, itaconic acid bromide, citraconic acid bromide, fumaric acid bromide, Hi-mic acid bromide, crotonic acid bromide, mesaconic acid bromide, sorbic acid bromide, tetrahydrophthalic acid bromide, methyltetrahydrophthalic acid bromide, maleic acid iodide, itaconic acid iodide, citraconic acid iodide, fumaric acid iodide, Hi-mic acid iodide, crotonic acid iodide, mesconic acid iodide, sorbic acid iodide, tetrahydrophthalic acid iodide, methyltetrahydrophthalic acid iodide, maleimide, succinimide, phthalimide, (meth)acrylic acid chloride, (meth)acrylic acid bromide, and (meth)acrylic acid iodide.

Alternatively, the reactive groups, such as a carbonyl group, a carboxyl group, a ester group, a amide group or an anhydride group, can be introduced into the cyclic monomer unit-containing polymer, without using the above-mentioned reactive agent, by subjecting the polymer to a reaction described below in the presence of a catalyst under apropriate conditions. Specifically, the introduction of the carbonyl group or the carboxyl group can be achieved by subjecting the polymer to carbonylation using carbon monoxide or to caboxylation using carbon monoxide or carbon dioxide. The introduction of an ester group can be achieved by subjecting the polymer to esterification reaction using an alcohol. The introduction of an amide group can be achieved by subjecting the polymer to amidation reaction using an amine. The introduction of an anhydride group can be achieved by dehydration reaction.

(ii) Epoxy-containing compounds

Specifically, unsaturated epoxy compounds having, in a molecule thereof, at least one unsaturated bond and at least one epoxy can be mentioned. Examples of such epoxy-containing compounds include an unsaturated glycidyl ester represented by the following formula:

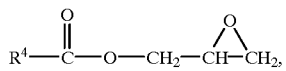

wherein $R^4$ is an organic compound group having at least one unsaturated bond; an unsaturated glycidyl ether represented by the following formula:

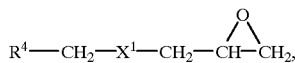

wherein $R^4$ is an organic compound group having at least one unsaturated bond, and $X^1$ is an ether group represented e either the formula —$CH_2$—O— or the formula

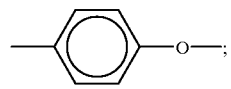

—O—; and
an alkenyl epoxy compound represented by the following formula:

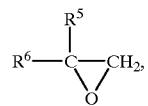

wherein $R^5$ is a hydrogen atom or an alkyl group, and $R^6$ is an organic compound group having at least one unsaturated bond.

More specific examples of epoxy-containing compounds include mono- or di-glycidyl esters of unsaturated carboxylic acids, such as acrylic acid, methacrylic acid, maleic acid, itaconic acid, citraconic acid, fumaric acid, Hi-mic acid, crotonic acid, mesaconic acid, sorbic acid, maleic acid, itaconic acid, citraconic acid, fumaric acid, Hi-mic acid, crotonic acid, mesaconic acid, sorbic acid, tetrahydrophthalic acid, methyltetrahydrophthalic acid, endo-cis-bicyclo[2.2.1]hepto-5-ene-2,3-dicarboxlylic acid (Nadic Acid®) and methyl-endo-cis-bicyclo[2.2.1]hepto-5-ene-2,3-dicarboxlylic acid (Methylnadic Acid®); mono-, di- or tri-glycidyl ester of butenetricarboxylic acid; styrene-p-glycidyl ether; 3,4-epoxy-1-butene; 3,4-epoxy-3-methyl-1-butene; 3,4-epoxy-1-pentene; 3,4-epoxy-3-methyl-1-pentene; and 5,6-epoxy-1-hexene.

Further, epoxy-containing compounds can be obtained by epoxydation reaction using oxygen, hydrogen peroxide or chlorine water.

(iii) Organic silicon compounds

Specifically, organic silicon compounds having, in a molecule thereof, at least one functional group other than unsaturated hydrocarbon group, at least one group having at least one unsaturated bond, and/or at least one member selected from hydrogen, halogen and a saturated bond, can be mentioned.

Examples of such organic silicon compounds include those which are represented by the following formulae:

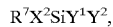
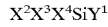

wherein each of $R^7$ and $R^8$ is independently an unsaturated organic compound group, each of $X^2$, $X^3$ and $X^4$ is independently hydrogen, halogen and a saturated organic compound group, and each of Y ,2 and $Y^3$ is independently a functional group other than an unsaturated organic compound group.

Examples of $R^7$ and $R^8$ include vinyl, acryl, methacryl, butenyl, hexenyl, cyclohexenyl, cyclopentadienyl and octenyl. Of these examples, groups containing a terminal olefinic unsaturated bond are especially preferred. Further examples of $R^7$ and $R^8$ include unsaturated organic compound groups having a terminal unsaturated acid ester bond, such as those which are represented by the following formulae:

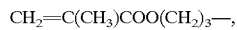
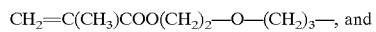

Of these examples, compound groups having a vinyl group are preferred.

Examples of the above-mentioned $X^2$, $X^3$ and $X^4$ include hydrogen, halogen, a $C_1$–$C_{20}$ hydrocarbon group and a halogenated hydrocarbon group.

Examples of the above-mentioned $Y^1$, $Y^2$ and $Y^3$, each of which is independently a functional group other than an unsaturated organic compound group, include an alkoxy group, such as methoxy, ethoxy or butoxy; an alkyl(or aryl)alkoxy group, such as methylethoxy; an acyloxy group, such as formyloxy, acetoxy or propionoxy; oxime groups, such as those which are represented by the following formulae:

—ON=C(CH$_3$)$_2$,

—ON=CHCH$_2$C$_2$H$_5$, and

—ON=C(C$_6$H$_5$)$_2$; and an amino group, a substituted amino group and a substituted aminoaryl group, such as those which are represented by the following formulae:

—NH$_2$,

—NHCH$_3$,

—NHC$_2$H$_5$, and

—NH(C$_6$H$_5$).

Especially preferred organic silicon compounds are represented by the formula $R^7SiY^1Y^2Y^3$ (wherein each of $R^7$, $Y^1$, $Y^2$ and $Y^3$ is as defined above). Commercially most preferred examples of such organic silicon compounds include a vinyltrisalkoxysilane [such as vinyltrimethoxysilane, vinyltriethoxysilane, and vinyltris(methoxyethoxy)silane], γ-(meth)acryloyloxypropyltrialkoxysilane, vinylethyldiethoxysilane, vinylphenyldimethoxysilane, a halogenated silane (such as trichlorosilane, dimethylchlorosilane or methyldichlorosilane), alkoxy silane (such as trimethoxysilane, triethoxysilane, methyldiethoxysilane, methyldimethoxysilane or phenyldimethoxysilane), an acyloxy silane (such as methyldiacetoxysilane and phenyldiacetoxysilane), ketoxymate silane [such as bis-(dimethylketoxymate)methylsilane, and bis-(cyclohexylketoxymate)methylsilane], and compounds obtained by polymerizing the above organic silicon compounds.

In a method for introducing a reactive group into the cyclic monomer unit-containing polymer, the amount of the reactive reagent to be used varies depending the type of reactive reagent, the reaction conditions of the addition reaction for bonding a reactive group to the cyclic monomer unit-containing polymer and the desired amount of the reactive group bonded to the cyclic monomer unit-containing polymer, but must be adjusted appropriately so that the curable resin (comprising at least one cyclic monomer unit-containing polymer having a reactive group) satisfies the following requirement:

$1 \leq J \leq 4$ wherein J is the average total number of reactive group or groups contained in the at least one cyclic monomer unit-containing polymer having a reactive group.

The above-mentioned reactive reagents may be used individually or in combination.

With respect to the method for introducing a reactive group into the cyclic monomer unit-containing polymer by use of a reactive reagent in the present invention, there is no particular limitation, and any of the conventional techniques can be employed. However, as preferred examples of methods, there can be mentioned a method in which the cyclic monomer unit-containing polymer and the reactive reagent are dissolved in an appropriate solvent and reacted with each other in the presence of a radical reaction initiator, a method in which the cyclic monomer unit-containing polymer, the reactive reagent and a radical reaction initiator are mixed together and reacted in a molten state or a method in which the cyclic monomer unit-containing polymer and the reactive reagent are mixed; if desired, the cyclic monomer unit-containing polymer is swelled with an appropriate solvent; and the resultant mixture is subjected to reaction by heating, electron beam irradiation or UV irradiation.

Examples of radical reaction initiators to be used in the present invention include a compound which produces a radical upon being thermally decomposed, such as an organic peroxide and an azo compound. Especially preferred is an organic peroxide whose thermal decomposition temperature at which the half life becomes 1 minute is 120° C. or more. Specific examples of such organic peroxides include benzoyl peroxide, dicumyl peroxide, 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 1,4-bis(tert-butylperoxyisopropyl)benzene, di-tert-butyloperoxide, cumene hydroperoxide and tert-butylperbenzoate.

In the present invention, the modification of the cyclic monomer unit-containing polymer for introducing the reactive group into the polymer can be performed by using the techniques described in "Catalysis of Organic Reaction", William R. Moser (published by Marcel Clekker Inc. U.S.A., 1981), "Homogeneous Catalyst" B. J. Luberoff (published by American Chemical Society Publications, U.S.A., 1968), and "Yuki kinzoku kagobutu O motiiru goseihanno (Synthesis using an organometallic compound)" vol. 1, vol. 2, Takeo Saegusa, Yoshihiko Ito, Makoto Kumada (published by Maruzen Co. Ltd., Japan, 1975), in which the modification of olefins or halides is performed using a metal catalyst. Specifically, the modification using the above-mentioned techniques can be performed by a carbonylation modification method comprising dissolving the cyclic monomer unit-containing polymer in an appropriate solvent, and reacting the polymer with carbon monoxide in the presence of a metallic catalyst, optionally in the presence of an oxidizing agent; a carboxylation modification method comprising reacting the cyclic monomer unit-containing polymer with carbon dioxide in the presence of a metallic catalyst; an esterification modification method which is performed in substantially the same manner as in the above-mentioned carbonylation modification or carboxylation modification, except that an alcohol is added to the reaction system; an amidation modification method which is conducted in substantially the same manner as in the above-mentioned esterification modification, except that an amine is used instead of the alcohol; or an acid anhydride-forming modification comprising subjecting the cyclic monomer unit-containing polymer to dehydration reaction. Further, for obtaining the cyclic monomer unit-containing polymer having a reactive group, a modified cyclic monomer unit-containing polymer (such as a halogenated product of the modified cyclic monomer unit-containing polymer) may be subjected to modification, such as carboxylation, esterification, amidation or imidation.

In the present invention, as a preferred method for producing the cyclic olefin monomer unit-containing polymer having a reactive group, there can also be mentioned a method in which an addition reaction at a carbon-to-carbon double bond contained in the cyclic conjugated diene polymer is performed so that the carbon-to-carbon double bond is saturated to become a single bond. In this method, the carbon-to-carbon double bond to be saturated may be one which is contained in the cyclic conjugated diene monomer unit and/or the chain conjugated diene monomer unit.

The addition reaction can be conducted also by conventional methods other than the above-mentioned modification methods. For example, the addition reaction can be conducted in the presence or in the absence of a catalyst by use of a reagent having active hydrogen, such as water, an amino acid, a carboxylic acid, a compound having a hydrosilyl group, chlorine water, and derivatives of these compounds.

In this method, when a reagent, such as water, carboxylic acid or chlorine water, is used, the addition reaction can be performed using a conventional acid catalyst. Examples of acid catalysts include inorganic solid catalysts, such as a zeolite; ion exchange resins, such as a fluorinated sulfonic acid resin; inorganic mineral acids; homogeneous catalysts, such as trifluoromethane sulfonate; and Lewis acid catalysts, such as silica, alumina and silica-alumina. With respect to the reaction conditions, the reaction may be performed under atmospheric pressure, under pressure or under reduced pressure, and the reaction pressure may be appropriately selected depending on the type of the reactor or the type of the reactive reagent. The reaction temperature may be appropriately selected within the range of from room temperature to about 300° C. More specifically, the addition reaction by the above-mentioned method can be conducted as follows. The cyclic monomer unit-containing polymer is dissolved in an appropriate solvent to obtain a polymer solution. A catalyst is added to the obtained solution, followed by addition of a reactive agent capable of forming a reactive group, such as water, an amine, a carboxylic acid or chlorine water. Then, the resultant mixture is heated to perform an addition reaction.

When it is intended to use a silyl group as a reactive group, the addition reaction can be performed in substantially the same manner as in the addition reaction by the above-mentioned method, except that a platinum catalyst needs to be used. Preferred examples of platinum catalysts include chloroplatinic acid, $[PtCl_2(C_2H_4)_2]$, $[PtCl_2(py)(C_2H_4)]$, $[PtCl_2(PEt_3)_2]$, $[Pt(PPh_3)_2(C_2H_4)]$ and $[Pt(C_2H_4)_2Si_2(O)(CH_3)_4]$ (wherein "py" represents pyridine, "Et" represents ethyl and "Ph" represents phenyl). More specifically, the addition of a silyl group can be conducted as follows. The cyclic monomer unit-containing polymer is dissolved in an appropriate solvent. The resultant solution is charged in an autoclave. Then, a platinum catalyst and a silylation reagent (e.g., methyldichlorosilane) are charged in the autoclave. The resultant mixture is heated to about 130° C., and stirred for about 4 hours to obtain a silyl group-containing polymer.

In the present invention, the thus obtained polymer having a reactive group may be subjected to further addition reaction with a cyclic or chain olefin, a halogenated compound, a carbonyl-containing compound, an epoxy-containing compound, a silane or the like in the presence or in the absence of a catalyst to introduce further reactive groups to the polymer.

In the present invention, the average total number (J) of the reactive groups contained in at least one polymer of the curable resin, wherein the at least one polymer is selected from polymers each independently having a polymer chain represented by formula (I), satisfies the following requirement: $1 \leq (J) \leq 4$. That is, (J) represents the average number of moles of the reactive groups per mol of the above-mentioned at least one polymer of the curable resin.

When (J) is less than 1, the curability of the curable resin becomes unsatisfactory. On the other hand, when (J) is more than 4, disadvantages are likely to be caused such that the curing rate of the curable resin becomes markedly high and such a high curing rate is difficult to control, and that the moldability of the cured resin obtained from such a curable resin lowers. Therefore, such a curable resin has no industrial value.

The separation and recovery of the polymer from the addition reaction mixture can be conducted by a conventional method which is generally used for recovering a conventional polymer from a polymerization reaction mixture.

Examples of such conventional separation and recovery methods include a steam-coagulation method comprising directly contacting the reaction mixture with steam; a method comprising adding a poor solvent for a polymer to the reaction mixture, thereby precipitating the polymer; a method comprising heating the reaction mixture in a reactor, thereby distilling off the solvent; and a method comprising extruding the reaction mixture through an extruder having a vent, while distilling off a solvent through the vent, thereby obtaining a pelletized polymer. A most suitable method can be selected depending on the properties of the solvent used and the polymer to be obtained.

The curable resin of the present invention may be provided in a single form, or in a composite form with another polymer material (including a cyclic conjugated diene polymer), an inorganic material, an inorganic reinforcing material or an organic reinforcing material, depending on the intended use of the curable resin.

When the curable resin [a resin (α)] of the present invention is intended to be used in the form of a resin composition with another resin [a resin (β)], such resin (β) may be appropriately selected from conventionally known organic polymers. There is no particular limitation with respect to the type and amount of the organic polymer.

Examples of such organic polymers include aliphatic polyamides, such as nylon 4, nylon 6, nylon 8, nylon 9, nylon 10, nylon 11, nylon 12, nylon 46, nylon 66, nylon 610, nylon 612, nylon 636 and nylon 1212; partially aromatic polyamides, such as nylon 4T (T: terephthalic acid), nylon 4I (I: isophthalic acid), nylon 6T, nylon 6I, nylon 12T, nylon 12I and nylon MXD6 (MXD: methaxylylenediamine); amide polymers, such as a copolymer or a blend of the above-mentioned aliphatic polyamides or partially aromatic polyamides; polyesters, such as a polybutylene terephthalate (PBT), a polyethylene terephthalate (PET), a polycarbonate (PC) and a polyarylate (PAR); olefin polymers, such as a polypropylene (PP), a polyethylene (PE), an ethylene-propylene rubber (EPR) and a polystyrene (PSt); conjugated diene polymers, such as a polybutadiene (PBd), a polyisoprene (PIp), a styrene-butadiene rubber (SBR), or a hydride thereof; thiol polymers, such as a polyphenylene sulfide (PPS); ether polymers, such as a polyacetal [e.g. polyoxymethylene (POM)] and a polyphenylene ether (PPE); acrylic resins; ABS resins; AS resins; polysulfones (PSF); polyether ketones (PEK) and polyamideimides (PAI).

These organic polymers may be used individually or, if desired, in the form of a mixture or in the form of a copolymer.

Examples of inorganic reinforcing materials include a glass fiber, a glass wool, a carbon fiber, talc, a mica, wollastonite, kaoline, a montmorillonite, a titanium whisker and a rock wool. Examples of organic reinforcing materials include an aramide, a polyimide, a liquid crystal polyester (LCP), a polybenzoimidazole and a polybenzothiazole.

Examples of the above-mentioned inorganic materials include a cement, sand and rock. Further, as the inorganic material, metals, such as iron and aluminum, can also be used.

In the resin composition of the present invention, which comprises the resin ($\alpha$) and the resin ($\beta$), the weight percentage of the resin ($\beta$), based on the total weight of the resin ($\alpha$) and the resin ($\beta$), is represented by the formula: 0.01 wt %$\leq \beta \leq$99.9 wt %.

Further, the resin composition of the present invention may further comprises at least one crosslinking agent ($\gamma$). Examples of crosslinking agents ($\gamma$) include (1) an amino resin obtained by the addition condensation reaction of an amino compound (such as melamine, benzoguanamine or urea) with formaldehyde, an alcohol or the like (especially preferred are an entirely alkylated melamine resin and a partially alkylated melamine resin); (2) a resol resin obtained by reacting phenol with an aldehyde in the presence of an alkali; (3) an isocyanate, such as polyisocyanate and a blocked isocyanate; (4) an amine, such as a primary amine, a secondary amine and a tertiary amine; (5) an acid, such as a polycarboxylic acid, or an acid anhydride; (6) an epoxy compound; (7) an alcohol; (8) a vinyl compound; (9) methyl acrylamideglycolate methyl ether; (10) acetoacetoxyethyl methacrylate; and (11) hydroxycarbamate. When the curing of the curable resin is conducted by wet curing, water (moisture) is used as a crosslinking agent.

Examples of amino resins mentioned in item (1) above include triazine compounds, such as a melamine-formaldehyde resin, hexamethoxymethylmelamine, butylated melamine, methylated melamine, benzoguanamine, formoguanamine and acetoguanamine; tetraalkoxymethylglycolylurea; and urea.

Examples of phenolic resins mentioned in item (2) above include mono-, di- or tri-methylolphenol, and condensation products thereof, or ethers thereof with a butyl group.

Examples of isocyanates mentioned in item (3) above include 2,4- or 2,6-tolylenediisocyanate, 4,4'-diphenylmethanediisocyanate, poly-(4,4'-diphenylmetyhanediisocyanate), m- or p-xylylenediisocyanate, hexamethylenediisocyanate, isophoronediisocyanate, naphtalenediisocyanate, a phenol-blocked isocyanate, an E-caprolactam-blocked isocyanate, methylethylketoxime-blocked isocyanate, an active methylene compound-blocked isocyanate and a water-soluble blocked isocyanate.

Examples of amines mentioned in item (4) above include polymethylenediamine, diethylenetriamine, bishexamethylenetriamine, polyetherdiamine, dimethylaminopropylamine, diethylaminopropylamine, 1,3-diaminocyclohexane, branched amines, amines having a spiro structure, amines having a piperazine ring, diaminodiphenylmethane, diaminodiphenylsulfone, 4,4'-bis (o-toluidine), m-phenylenediamine, N-methylpiperazine, morpholine, triethanolamine, dialkylaminoethanol, 1,4-diazacyclo(2,2,2)octane, benzyldimethylamine and 2,5-dimethyl-2,5-hexanediamine.

Examples of acid anhydrides mentioned in item (5) above include phthalic anhydride, maleic anhydride, hexahydrophthalic anhydride, pyromellitic anhydride, benzophenonetetracarboxylic anhydride, maleic anhydride-styrene copolymer, ethylene glycol bistrimellitate, and m-carboxyphenyl-3,4-anhydride-phenyldimethylsilane.

As a representative example of epoxy compound mentioned in item (6) above, there can be mentioned bisphenol A. However, various epoxy compounds can be used in the present invention. Examples of epoxy compounds include a glycidyl methacrylate copolymer, a glycidyl ester of a carboxylic acid, an epoxy-containing alicyclic compound. Specific examples of epoxy compounds include triglycidyl isocyanurate, 3,4-epoxycyclohexylmethyl-3,4-epoxycyclohexane carboxylate and an epoxidated melamine resin.

Examples of alcohols mentioned in item (7) above include a polyether polyol, a polybutadiene glycol, a polycaprolactone polyol and tris(2-hydroxyethyl) isocyanurate.

Examples of vinyl compounds mentioned in item (8) above include a polyvinyl compounds, such as divinyl benzene; polyallyl compounds, such as diallyl phthalate and triallyl trimellitate and diethylene glycol bis(allylcarbonate); glycols and derivatives thereof, such as ethylene glycol diacrylate; a reaction product of a polyol (such as trimethylolpropane) and (meth)acrylic acid; a reaction product of a polyepoxide with (meth)acrylic acid; polyallyl glycidyl ether; triallyl isocyanurate; and triallyl cyanurate.

With respect to the combination of the resin ($\alpha$) and the crosslinking agent ($\gamma$), there is no particular limitation. The resin ($\alpha$) comprising at least one cyclic monomer unit-containing polymer having a reactive group may be mixed with crosslinking agent ($\gamma$) in an appropriately selected amount ratio.

In the resin composition of the present invention, which comprises the resin ($\alpha$), the resin ($\beta$) and at least one crosslinking agent ($\gamma$), the weight percentages of the resin ($\alpha$), the resin ($\beta$) and the crosslinking agent ($\gamma$), based on the total weight of the resin ($\alpha$), the resin ($\beta$) and the crosslinking agent ($\gamma$), are, respectively, represented by the formulae: 0 wt %$\leq \alpha <$100 wt %, 0 wt %$\leq \beta <$100 wt %, and 0 wt %$<\gamma <$100 wt %.

In preparation of the resin composition of the present invention, there is no particular limitation with respect to the order in mixing the components ($\alpha$), ($\beta$) and ($\gamma$).

Further, there is no particular limitation with respect to the method for mixing the components ($\alpha$), ($\beta$) and ($\gamma$), and the mixing can be conducted by a solution mixing method, a heat melting method or the like. Examples of solvents usable in the solution mixing method include halogenated hydrocarbons and halogenated aromatic hydrocarbons, such as dichloromethane, chloroform, trichloroethylene and dichlorobenzene; aromatic hydrocarbons, such as benzene, toluene and xylene. These solvents can be used individually or in combination. By subjecting the solution of the resin composition in the above-mentioned solvent to casting, the resin composition can be shaped into a film.

The molding of the resin composition can also be conducted by the above-mentioned heat melting method in which the mixing of the components and the molding of the resultant mixture can be simultaneously conducted. Specific examples of heat melting method include an injection molding method, a transfer molding method, an extrusion molding method and a press molding method. The temperature for conducting the heat melting of the resin composition can be appropriately selected within the range of from the glass transition temperature of the resin composition to the temperature at which the resin composition begins to cure.

With respect to the method for effecting the curing of the resin composition of the present invention, there is no particular limitation, and the curing can be effected by using heat, light, electron beam or the like.

In the present invention, for enabling the curing of the resin composition at a relatively low temperature or for facilitating the formation of the crosslinked structure in the resin composition, the resin composition of the present invention may further comprises a radical initiator as a catalyst for the curing reaction of the resin composition. It is preferred that the radical initiator is used in an amount of from 0.1 to 10 parts by weight, more preferably from 0.1 to 5 parts by weight, based on 100 parts by weight of the total of components (α), (β) and (γ). Representative examples of radical initiators include peroxides, such as bezoyl peroxide, cumene hydroperoxide, 2,5-dimethylhexane-2,5-dihydroperoxide, tert-butylcumyl peroxide, α,α'-bis(tert-butylperoxy-m-isopropyl)benzene, 2,5-dimethyl-2,5-di(tert-butylperoxy)hexane, dicumyl peroxide, di-tert-butylperoxoisophthalate, tert-butylperbenzoate, 2,2-bis(tert-butylperoxy)butane, 2,2-bis(tert-butylperoxy) octane, 2,5-dimethyl-2,5-di(bezoilperoxy)hexane, di(trimethylsilyl) peroxide, and trimethylsilyltriphenylsilyl peroxide. However, the radical initiator usable in the present invention is not limited to the above-mentioned peroxides. For example, in the present invention, as a radical initiator, 2,3-dimethyl-2,3-diphenylbutane (which is not a peroxide) can also be used.

When the curing reaction of the curable resin is conducted by heating, the temperature for the heating may vary depending on whether or not the resin composition contains a radical initiator, and depending on the type of the radical initiator, if any. However, it is preferred that the curing reaction by heating is conducted at a temperature of from 100 to 450° C., more preferably from 150 to 400° C. With respect to the reaction time for the curing reaction by heating, the reaction time is preferably from 30 seconds to 5 hours, more preferably from 1 minute to 3 hours.

The degree of curing of the resin in the course of the curing reaction can be examined by differential scanning calorimetry or infrared absorption spectroscopy.

The curing reaction of the curable resin and resin compositions of the present invention can be conducted in the presence or absence of a catalyst. Examples of catalysts which can be used for the curing reaction of the curable resin and resin compositions of the present invention include known silanol condensation reaction catalysts, such as an alkyl titanate, an organosilicon titanate, a carboxylic acid salt (such as tin octylate, dibutyltin laurate, dibutyltin maleate and dibutyltin phthalate), and an amine salt. With respect to such a catalyst, it is preferred that the catalyst is used in an amount of from 0 to 10% by weight, based on the weight of the resin composition of the present invention.

Each of the curable resin and resin compositions of the present invention may contain fillers and/or additives so as to have characteristics or properties which are desired in accordance with the intended use of the final product. The fillers and/or the additives are used in such amounts as will not adversely affect the inherent properties of the curable resin or resin compositions of the present invention. The fillers may be used in the form of fiber or powder. Examples of fillers include a glass fiber, an aramide fiber, a carbon fiber, a boron fiber, a ceramic fiber, a asbestos fiber, a carbon black, silica, alumina, talc, mica, glass beads and glass balloons. Examples of additives include a stabilizer (such as an antioxidant, a thermal stabilizer, an antistatic agent and an ultraviolet ray adsorbing agent), a lubricant, nucleators, a plasticizer, a pigment, a dye, a coloring agent, an anti-slip agent, an antiblocking agent, a mold-release agent, other polymer materials, a flame retardant and an auxiliary agent for a flame retardant.

Specific examples of silica fillers include fumed silica, precipitated silica, silicic acid and water-containing silica. Further examples of fillers include a reinforcing material (such as a carbon black), calcium carbonate, magnesium carbonate, diatomaceous earth, calcined clay, titanium oxide, bentonite, organobentonite, ferric oxide and zinc oxide.

The types of fillers used are appropriately selected in accordance with the desired properties of ultimate cured products. For example, when it is desired to impart the cured product with high toughness, it is advantageous to use fumed silica, precipitated silica, silicic acid, water-containing silica, carbon black and calcined clay. For achieving high toughness of the cured product, these fillers may be used in an amount of from 1 to 100 parts by weight, relative to 100 parts by weight of the curable resin or the resin composition. When it is desired to impart the cured product with high tensile elongation, it is advantageous to use titanium oxide, calcium carbonate, magnesium carbonate, talc, ferric oxide and zinc oxide. For achieving high tensile elongation of the cured resin, these fillers may be used in an amount of from 2 to 100 parts by weight, relative to 100 parts by weight of the curable resin or the resin composition. These fillers may be used individually or in combination.

With respect to the above-mentioned plasticizer additive which can be used in the present invention, any customary plasticizers can be used. Examples of plasticizers include phthalic esters, such as dioctyl phthalate, dibutyl phthalate, butyl benzyl phthalate; dibasic acid esters, such as dioctyl adipate, isodecyl succinate and dibutyl sebacate; glycol esters, such as diethylene glycol dibenzoate; pentaerythritol esters; aliphatic acid esters, such as butyl oleate and methyl acetylricinoleate; phosphoric esters, such as tricresyl phosphate, trioctyl phosphate and octyl diphenyl phosphate; epoxy-containing plasticizers, such as an epoxidized soy bean oil and benzyl epoxystearate; and a chlorinated paraffin. These plasticizers may be used individually or in combination. These plasticizers may be used in an amount of from 2 to 100 parts by weight, relative to 100 parts by weight of the curable resin or the resin compositions.

Each of the curable resin and resin composition of the present invention may be individually used either in a one-pack curable resin composition or in a two-pack curable resin composition. For example, when the curable resin or resin composition of the present invention is used in a two-pack resin composition, a first component comprising the curable resin or resin composition of the present invention, a filler and a plasticizer is provided and stored separately from a second component comprising a condensation reaction catalyst, a crosslinking agent, a filler and a plasticizer. The first component and the second component are mixed together in use. When the curable resin or resin composition of the present invention is used in a one-pack curable resin composition, the curable resin or resin composition of the present invention, a filler, a plasticizer and a condensation reaction catalyst, each of which has been fully dehydrated and dried, are mixed together in the absence of water or moisture to provide a one-pack curable resin composition, which may then be stored as such.

The curable resin and resin composition of the present invention can be advantageously used as excellent industrial materials. Specifically, each of the curable resin and resin composition is useful as a plastic; a thermoplastic elastomer; a fiber; a sheet; a film; a material for a mechanical part, a food container, a packing material, a tire, a belt and the like; an insulating agent; an adhesive; a paint; and a modifier for other resins. Further, the curable resin and resin composition of the present invention can be advantageously used in the field of construction and civil engineering. Specifically, in these fields, the curable resin and resin composition can be advantageously used as a base polymer for various materials; an additive for a cement; a resin for a sealant; and a sealant for a building, a vessel, an automobile, a road or the like. In addition, each of the curable resin and resin composition of the present invention can be individually used as a sealant and an adhesive which are for various materials, such as a glass, a porcelain, a wooden material, a metal and a resin article (in practice, prior to the operation of applying such a sealant or an adhesive on a substrate, a primer may be applied to a substrate). Further, it is expected that the curable resin and resin composition of the present invention can be used as a food packaging material and a casting rubber material.

Further, the curable resin and resin composition of the present invention can be advantageously used in fields in which there is a need for functional materials or articles, such as a functional polymer, a polymeric catalyst and a separator membrane.

BEST MODE FOR CARRYING OUT THE INVENTION

Hereinbelow, the present invention will be described in more detail with reference to the following Reference Examples and Examples, but they should not be construed as limiting the scope of the present invention.

REFERENCE EXAMPLE 1
(Preparation of a polymerization catalyst)

In an atmosphere of dried argon gas, a given amount of tetramethylethylenediamine (TMEDA) was dissolved in a mixed solvent of cyclohexane and n-hexane having a cyclohexane/n-hexane ratio of 9/1 (V/V). The resultant solution was cooled to and maintained at −10° C. Then, in the atmosphere of dried argon gas, an n-hexane solution of n-butyllithium (n-BuLi) was gradually added to the solution of TMEDA in cyclohexane/n-hexane in an amount such as would provide a TMEDA/n-BuLi molar ratio of 1/4. As a result, a complex of TMEDA/n-BuLi to be used as a polymerization catalyst was obtained.
(Polymerization for producing a cyclohexadiene homopolymer)

A well dried 100 ml Schlenk tube was purged with dried argon gas by a conventional method. 3.00 g of 1,3-cyclohexadiene and 20.0 g of cyclohexane were charged in the Schlenk tube. While maintaining the temperature of the resultant solution at 30° C., the above-obtained polymerization catalyst (complex) of TMEDA/n-BuLi was added to the solution in an amount of 0.07 mmol in terms of the amount of lithium atom, and a polymerization reaction was conducted for 4 hours in a dried argon atmosphere.

After that period of time, a 10 wt % solution of 2,6-bis (t-butyl)-4-methylphenol (BHT) in methanol was added to the reaction mixture, to thereby terminate the polymerization reaction. Then, the resultant reaction mixture was treated with a large amount of a mixture of methanol and hydrochloric acid, thereby separating a polymer formed in the reaction mixture. The separated polymer was washed with methanol and then, dried at 80° C. in vacuo, thereby obtaining a white mass of the cyclohexadiene homopolymer (PCHD) in a yield of 100%.

The number average molecular weight ($\overline{Mn}$)* of the obtained homopolymer was 44,500. The molecular weight distribution ($\overline{Mw/Mn}$)* was 1.07.

Note *): For determining the number average molecular weight and weight average molecular weight (and also the molecular weight distribution) of the polymer, the polymer was dissolved in 1,2,4-trichlorobenzene (TCB), and the resultant solution was subjected to gel permeation chromatography (GPC). The number average molecular weight and weight average molecular weight of the polymer were determined using a calibration curve obtained from standard polystyrenes.

REFERENCE EXAMPLE 2
(Cyclohexadiene homopolymer)

Substantially the same procedure as in Reference Example 1 was repeated, except that the reaction was performed for 1 hour. As a result, a cyclohexadiene homopolymer was obtained in a yield of 100%. The $\overline{Mn}$ of the obtained homopolymer was 9,2000 and the $\overline{Mw/Mn}$ was 1.03.

REFERENCE EXAMPLE 3
(Cyclohexadiene-butadiene diblock copolymer)

A well dried 5 liter high-pressure autoclave having an electromagnetic induction agitator was purged with dried nitrogen gas by a conventional method.

2,800 g of cyclohexane and 60 g of 1,3-cyclohexadiene were charged in the autoclave. A polymerization catalyst (complex) obtained in the same manner as in Reference Example 1 was added to the autoclave in an amount of 10.48 mmol in terms of the amount of lithium atom. Then, a polymerization reaction was performed at 30° C. for 4 hours, to thereby obtain a cyclohexadiene homopolymer (step 1). Subsequently, 280 g of butadiene was charged in the autoclave, and a polymerization reaction was further conducted at 60° C. for 30 minutes to thereby obtain a cyclohexadiene-butadiene diblock copolymer (step 2). After that period of time, heptanol was added to the resultant reaction mixture, to thereby terminate the polymerization reaction. Then, to the reaction mixture was added a stabilizer [Irganox B215 (0037HX), manufactured and sold by CIBA GEIGY, Switzerland] and then, removal of the solvent was conducted by a conventional method, to thereby obtain a viscous mass of a cyclohexadiene-butadiene diblock copolymer [P(CHD-Bd)].

The $\overline{Mn}$ (measured using a calibration curve obtained from standard polystyrenes) and $\overline{Mw/Mn}$ of the obtained polymer were 47,500 and 1.10, respectively.

REFERENCE EXAMPLE 4
(Cyclohexadiene-butadiene diblock copolymer)

The production of a cyclohexadiene homopolymer was conducted in substantially the same manner as in Reference Example 3, except that the reaction time was changed. That is, the production of the homopolymer was conducted as follows. 2,800 g of cyclohexane and 60 g of 1,3-cyclohexadiene were charged in the autoclave. A polymerization catalyst (complex) obtained in the same manner as in Reference Example 1 was added to the autoclave in an amount of 10.48 mmol in terms of the amount of lithium atom. Then, a polymerization reaction was performed at 30° C. for 0.5 hour, to thereby obtain a cyclohexadiene homopolymer (step 1). Subsequently, 280 g of butadiene was charged in the autoclave, and a polymerization reaction was further conducted at 60° C. for 10 minutes to thereby obtain a cyclohexadiene-butadiene diblock copolymer (step 2). After that period of time, heptanol was added to the resultant reaction mixture, to thereby terminate the polymerization reaction. The post-polymerization treatment was conducted in substantially the same manner as in Reference Example 3 to thereby obtain a cyclohexadiene-butadiene diblock copolymer [P(CHD-Bd)].

The $\overline{Mn}$ of the obtained polymer was 5,700. The $\overline{Mw/Mn}$ was 1.05.

REFERENCE EXAMPLE 5
(Cyclohexadiene-butadiene-cyclohexadiene triblock copolymer)

The production of a cyclohexadiene-butadiene diblock copolymer was conducted in the same manner as in Reference Example 3. To the resultant polymerization reaction mixture containing the obtained block copolymer was added 60 g of 1,3-cyclohexadiene, and a polymerization reaction was further conducted at 30° C. for 2 hours, to thereby obtain a cyclohexadiene-butadiene-cyclohexadiene triblock copolymer (step 3).

After that period of time, the polymerization reaction was terminated in the same manner as in Reference Example 3 and then, the post-polymerization treatment was conducted in substantially the same manner as in Reference Example 3 to thereby obtain a cyclohexadiene-butadiene-cyclohexadiene triblock copolymer [P(CHD-Bd-CHD)] exhibiting rubber elasticity.

The $\overline{Mn}$ (measured using a calibration curve obtained from standard polystyrenes) and $\overline{Mw}/\overline{Mn}$ of the obtained polymer were 97,000 and 1.05, respectively.

REFERENCE EXAMPLE 6
(Cyclohexadiene-butadiene-cyclohexadiene triblock copolymer)

The production of a cyclohexadiene-butadiene diblock copolymer was conducted in the same manner as in Reference Example 5. To the resultant polymerization reaction mixture containing the obtained block copolymer was added 60 g of 1,3-cyclohexadiene, and a polymerization reaction was further conducted at 30° C. for 0.5 hour, to thereby obtain a cyclohexadiene-butadiene-cyclohexadiene triblock copolymer (step 3).

After that period of time, the polymerization reaction was terminated in the same manner as in Reference Example 5 and then, the post-polymerization treatment was conducted in substantially the same manner as in Reference Example 5 to thereby obtain a cyclohexadiene-butadiene-cyclohexadiene triblock copolymer [P(CHD-Bd-CHD)].

The $\overline{Mn}$ (measured using a calibration curve obtained from standard polystyrenes) and $\overline{Mw}/\overline{Mn}$ of the obtained polymer were 10,000 and 1.01, respectively.

REFERENCE EXAMPLE 7
(Cyclohexadiene-styrene diblock copolymer)

A well dried 5 liter high-pressure autoclave having an electromagnetic induction agitator was purged with dried nitrogen gas by a conventional method.

2,800 g of cyclohexane and 60 g of 1,3-cyclohexadiene were charged in the autoclave. A polymerization catalyst (complex) obtained in the same manner as Reference Example 1 was added to the autoclave in an amount of 10.48 mmol in terms of the amount of lithium atom. Then, a polymerization reaction was conducted at 30° C. for 4 hours, to thereby obtain a cyclohexadiene homopolymer (step 1). Subsequently, 280 g of styrene was charged in the autoclave, and a polymerization reaction was further conducted at 70° C. for 20 minutes to thereby obtain a cyclohexadiene-styrene diblock copolymer (step 2).

After that period of time, heptanol was added to the resultant reaction mixture to thereby terminate the polymerization reaction. To the reaction mixture was added a stabilizer [Irganox B215 (0037HX), manufactured and sold by CIBA GEIGY, Switzerland] and then, removal of the solvent was conducted by a conventional method to thereby obtain a cyclohexadiene-styrene diblock copolymer [P(CHD-St)].

The $\overline{Mn}$ (measured using a calibration curve obtained from standard polystyrenes) and $\overline{Mw}/\overline{Mn}$ of the obtained polymer were 49,000 and 1.12, respectively.

EXAMPLE 1
(Synthesis of a trimethoxysilane-modified polycyclohexadiene)

In an atmosphere of dried nitrogen gas, 100 parts by weight of the cyclohexadiene homopolymer obtained in Reference Example 1, 0.75 parts by weight of trichlorosilane and 0.03 parts by weight of chloroplatinic acid [used in the form of a solution thereof in isopropanol (hereinafter, isopropanol is frequently, simply referred to as "IPA")] were added to 200 cm³ of toluene to thereby obtain a mixture. The obtained mixture was stepwise heated to 100° C. and a reaction was performed at 100° C. for 4 hours to thereby obtain a reaction mixture containing a polymer having reactive groups (derived from trichloroxysilane) in an amount of 4.5 mmol in terms of the amount of silicon atom [the average number (J) of reactive groups=2]. (The determination of silicon was conducted by a method in which a part of the reaction mixture containing the obtained polymer was sampled, the unreacted trichlorosilane was removed from the sampled reaction mixture, and the amount of chloro group was measured by titration using a 1 N aqueous solution of sodium hydroxide.)

200 cm³ of methanol was added to the reaction mixture containing the obtained polymer, and a reaction was performed, while refluxing the methanol, to thereby obtain a trimethoxysilane-modified polycyclohexadiene (Si-PCHD 1).

EXAMPLE 2
(Synthesis of a trimethoxysilane-modified polycyclohexadiene)

Substantially the same procedure as in Example 1 was repeated, except that use was made of cyclohexadiene homopolymer obtained in Reference Example 2 and 3.6 g of trichlorosilane. As a result, a trimethoxysilane-modified polycyclohexadiene (Si-PCHD 2) having reactive groups (derived from trimethoxysilane) in an amount of 22 mmol (J=2) in terms of the amount of silicon atom.

EXAMPLE 3
(Synthesis of an allyl glycidyl ether-modified polycyclohexadiene)

In an atmosphere of dried nitrogen gas, 100 parts by weight of the cyclohexadiene homopolymer obtained in Reference Example 1 and 0.61 part by weight of allyl glycidyl ether were added to 200 cm³ of 1,2,4-trichlorobenzene (TCB) to thereby obtain a mixture. The obtained mixture was heated to 120° C. while stirring, to thereby completely dissolve the cyclohexadiene homopolymer and allyl glycidyl ether in TCB. To the resultant solution was gradually added 0.5 mmol of a 50% dilution product of benzoyl peroxide with dioctyl phthalate (Nyper BO, manufactured and sold by Nippon Oil & Fats Co., Ltd., Japan), and in the atmosphere of dried nitrogen gas, a reaction was performed at 120° C. for 2 hours. After completion of the reaction, the resultant reaction mixture was subjected to reprecipitation several times using acetone/TCB, to thereby obtain an allyl glycidyl ether-modified cyclohexadiene homopolymer. The modified cyclohexadiene homopolymer was heated under reduced pressure to remove the unreacted allyl glycidyl ether to thereby obtain an allyl glycidyl ether-modified polycyclohexadiene (EP-PCHD) having reactive groups (derived from allyl glycidyl ether) in an amount of 5 mmol in terms of the amount of epoxy group (J=2). The determination of epoxy group was conducted by a method in which the allyl glycidyl ether-modified polycyclohexadiene was dissolved in TCB, a ring opening reaction was performed using methanol in the presence of sodium methoxide as a catalyst, and the amount of hydroxyl groups was measured by the acetic anhydride method.

EXAMPLE 4
(Synthesis of a maleic anhydride-modified polycyclohexadiene)

In an atmosphere of dried nitrogen gas, 100 parts by weight of the cyclohexadiene homopolymer obtained in Reference Example 1 and 120 parts by weight of maleic anhydride was added to 200 cm$^3$ of 1,2,4-trichlorobenzene (TCB) to thereby obtain a mixture. The obtained mixture was heated to 120° C. while stirring, to thereby completely dissolve the cyclohexadiene homopolymer and maleic anhydride in TCB. To the resultant solution was gradually added 24 mmol of a 50% dilution product of benzoyl peroxide with dioctyl phthalate (Nyper BO, manufactured and sold by Nippon Oil & Fats Co., Ltd., Japan), and in the atmosphere of dried nitrogen gas, a reaction was performed at 120° C. for 5 hours. After completion of the reaction, the resultant reaction mixture was subjected to reprecipitation several times using acetone/TCB, to thereby obtain a maleic anhydride-modified cyclohexadiene homopolymer. The modified cyclohexadiene homopolymer was heated under reduced pressure to remove the unreacted maleic anhydride. 2,6-Di(tert-butyl)-4-methylphenol was added as a stabilizer to the modified cyclohexadiene homopolymer in an amount of 0.5 part by weight, relative to 100 parts by weight of the modified cyclohexadiene homopolymer, while melt kneading**) at 230° C.

Note **): The melt kneading was conducted using Labo Plastomil (30C150) (manufactured and sold by Toyo Seiki Co., Ltd., Japan) having a twin-screw extruder (2D20SH) (manufactured and sold by Toyo Seiki Co., Ltd., Japan) connected thereto. A polymer was melt extruded at a revolution rate of 50 rpm at 230 to 280° C., to thereby obtain strands. The obtained strands were pelletized by means of a cutter specially designed for use with the extruder.

Measurement of the content of reactive groups in the maleic anhydride-modified polycyclohexadiene (M-PCHD 1) was conducted.

The content of reactive groups (derived from maleic anhydride) in M-PCHD1 was 0.7 wt % (J=2.3) as measured by titration using sodium methylate.

EXAMPLE 5
(Synthesis of a maleic anhydride-modified polycyclohexadiene)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) were added to 100 parts by weight of the cyclohexadiene homopolymer obtained in Reference Example 1 to thereby obtain a mixture. Irganox B215 was added as a stabilizer to the obtained mixture in an amount of 3,000 ppm, based on the weight of the cyclohexadiene homopolymer. While melt kneading the resultant mixture at 180 to 290° C., a reaction was conducted to thereby obtain a maleic anhydride-modified polycyclohexadiene (M-PCHD 2).

The content of reactive groups (derived from maleic anhydride) in the obtained M-PCHD2 was 0.55 wt % (J=2.32) as measured in the same manner as in Example 4.

EXAMPLE 6
(Synthesis of a glycidyl methacrylate-modified polycyclohexadiene)

Substantially the same procedure as in Example 5 was repeated, except that glycidyl methacrylate was used as a modifying agent instead of the maleic anhydride. As a result, a glycidyl methacrylate-modified cyclohexadiene homopolymer (G-PCHD) was obtained. The content of reactive groups (derived from glycidyl ether) in the obtained glycidyl methacrylate-modified cyclohexadiene homopolymer (G-PCHD) was 1% (J=3.46). The content of the reactive groups (derived from glycidyl methacrylate) in the obtained G-PCHD was measured in the same manner as in Example 3.

EXAMPLE 7
(Synthesis of a γ-methacryloyloxypropyl-trimethoxysilane-modified polycyclohexadiene)

2.5 Parts by weight of γ-methacryloyloxypropyl-trimethoxysilane (KBM-503, manufactured and sold by The Shin-Etsu Chemical Co., Ltd., Japan) and 0.5 part by weight of 2,5-dimethyl-2,5-di(tert-butyl peroxy)hexane having a purity of 90% or more (Perhexa 25B, manufactured and sold by Nippon Oil & Fats Co., Ltd., Japan) were added to 100 parts by weight of the cyclohexadiene homopolymer obtained in Example 4 to thereby obtain a mixture. Irganox B215 was added as a stabilizer to the obtained mixture in an amount of 3,000 ppm, based on the weight of the cyclohexadiene homopolymer. While melt kneading the resultant mixture at 180 to 290° C., a reaction was conducted to thereby obtain a γ-methacryloyloxypropyl-trimethoxysilane-modified cyclohexadiene homopolymer (Si-PCHD). The content of reactive groups (derived from γ-methacryloyloxypropyl-trimethoxysilane) in the obtained Si-PCHD was 1% (J=3.69).

EXAMPLE 8
(Modification of a cyclohexadiene-butadiene diblock copolymer)

In an atmosphere of dried nitrogen gas, 100 parts by weight of the cyclohexadiene-butadiene diblock copolymer obtained in Reference Example 3, 0.7 part by weight of trichlorosilane and 0.03 part by weight of chloroplatinic acid [used in the form of a solution thereof in IPA] were added to 200 cm$^3$ of toluene to thereby obtain a mixture. The obtained mixture was stepwise heated to 100° C. and a reaction was performed at 100° C. for 4 hours to thereby obtain a polymer having reactive groups (derived from trichlorosilane) in an amount of 4.8 mmol in terms of the amount of silicon atom (J=2.3). (The determination of silicon was conducted by a method in which a part of the reaction mixture containing the obtained polymer was sampled, the unreacted trichlorosilane was removed from the sampled reaction mixture, and the amount of chloro group was measured by titration using a 1 N aqueous solution of sodium hydroxide.)

200 cm$^3$ of methanol was added to the resultant reaction mixture containing the obtained polymer, and a reaction was performed, while refluxing the methanol to thereby obtain a trimethoxysilane-modified cyclohexadiene-butadiene diblock copolymer [Si-P(CHD-Bd) 1].

EXAMPLE 9
(Modification of a cyclohexadiene-butadiene diblock copolymer)

Substantially the same procedure as in Example 8 was repeated, except that use was made of the cyclohexadiene-butadiene diblock copolymer obtained in Reference Example 4 and 5.8 g of trichlorosilane. As a result, a trimethoxysilane-modified cyclohexadiene-butadiene diblock copolymer [Si-P(CHD-Bd) 2] having reactive groups (derived from trimethoxysilane) in an amount of 37 mmol (J=2.1) in terms of the amount of silicon atom was obtained.

EXAMPLE 10

(Modification of a cyclohexadiene-butadiene diblock copolymer)

In an atmosphere of dried nitrogen gas, 100 parts by weight of the cyclohexadiene-butadiene diblock copolymer obtained in Reference Example 3 and 0.58 part by weight of allyl glycidyl ether were added to 200 cm$^3$ of 1,2,4-trichlorobenzene (TCB) to thereby obtain a mixture. The obtained mixture was heated to 120° C. while stirring, to thereby completely dissolve the cyclohexadiene-butadiene diblock copolymer and allyl glycidyl ether in TCB. To the resultant solution was gradually added 0.5 mmol of a 50% dilution product of benzoyl peroxide with dioctyl phthalate (Nyper BO, manufactured and sold by Nippon Oil & Fats Co., Ltd., Japan), and in the atmosphere of dried nitrogen gas, a reaction was performed at 120° C. for 2 hours. After completion of the reaction, the resultant reaction mixture was subjected to reprecipitation several times using acetone/TCB, to thereby obtain an allyl glycidyl ether-modified cyclohexadiene-butadiene diblock copolymer. The modified cyclohexadiene-butadiene diblock copolymer was heated under reduced pressure to remove the unreacted allyl glycidyl ether to thereby obtain an allyl glycidyl ether-modified cyclohexadiene-butadiene diblock copolymer [EP-P(CHD-Bd) 1] having reactive groups (derived from allyl glycidyl ether) in an amount of 4.8 mmol in terms of the amount of epoxy group (J=2.3). The determination of epoxy group was conducted by a method in which the allyl glycidyl ether-modified cyclohexadiene-butadiene diblock copolymer was dissolved in TCB, a ring opening reaction was performed using methanol in the presence of sodium methoxide as a catalyst, and the amount of hydroxyl group was measured by the acetic anhydride method.

EXAMPLE 11

(Modification of a cyclohexadiene-butadiene diblock copolymer)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) were added to 100 parts by weight of the cyclohexadiene-butadiene diblock copolymer obtained in Reference Example 3 to thereby obtain a mixture. Irganox B215 was added as a stabilizer to the obtained mixture in an amount of 3,000 ppm, based on the weight of the cyclohexadiene-butadiene diblock copolymer. While melt kneading the resultant mixture at 180 to 290° C., a reaction was performed to thereby obtain a maleic anhydride-modified cyclohexadiene-butadiene diblock copolymer[M-P(CHD-Bd) 1]. The content of reactive groups (derived from maleic anhydride) in the obtained M-P(CHD-Bd)1 was 0.7% (J=3.38).

The content of the reactive groups in the obtained M-PCHD was measured in the same manner as in Example 4.

EXAMPLE 12

(Modification of a cyclohexadiene-butadiene diblock copolymer)

Substantially the same procedure as in Example 11 was repeated, except that use was made of cyclohexadiene-butadiene diblock copolymer obtained in Reference Example 4. As a result, a maleic anhydride-modified cyclohexadiene-butadiene diblock copolymer [M-P(CHD-Bd) 2] was obtained. The content of reactive groups (derived from maleic anhydride) in the obtained [M-P(CHD-Bd) 2] was 2.6% (J=1.51 ).

EXAMPLE 13

(Modification of a cyclohexadiene-butadiene diblock copolymer)

Substantially the same procedure as in Example 10 was repeated, except that glycidyl methacrylate was used as a modifying agent instead of the maleic anhydride. As a result, a glycidyl methacrylate-modified cyclohexadiene-butadiene diblock copolymer [G-(PCHD-PBd)] was obtained. The content of reactive groups (derived from maleic anhydride) in the obtained G-P(CHD-Bd) was 0.63% (J=2.11).

EXAMPLE 14

(Modification of a cyclohexadiene-butadiene-cyclohexadiene triblock copolymer)

In an atmosphere of dried nitrogen gas, 100 parts by weight of the cyclohexadiene-butadiene-cyclohexadiene triblock copolymer obtained in Reference Example 5, 0.35 part by weight of trichlorosilane and 0.03 part by weight of chloroplatinic acid (used in the form of a solution thereof in IPA) were added to 200 cm$^3$ of toluene to thereby obtain a mixture. The obtained mixture was stepwise heated to 100° C. and a reaction was performed at 100° C. for 4 hours to thereby obtain a polymer having reactive groups in an amount of 2.4 mmol in terms of the amount of silicon atom (J=2.33). (The determination of silicon was conducted by a method in which a part of the reaction mixture containing the obtained polymer was sampled, the unreacted trichlorosilane was removed from the sampled reaction mixture, and the amount of chloro group was measured by titration using a 1 N aqueous solution of sodium hydroxide.)

200 cm$^3$ of methanol was added to the resultant reaction mixture containing the obtained polymer, and a reaction was performed, while refluxing the methanol, to thereby obtain a trimethoxysilane-modified cyclohexadiene-butadiene triblock copolymer [Si-P(CHD-Bd-CHD) 1] having reactive groups (derived from trimethoxysilane).

EXAMPLE 15

(Modification of a cyclohexadiene-butadiene-cyclohexadiene triblock copolymer)

Substantially the same procedure as in Example 8 was repeated, except that use was made of the cyclohexadiene-butadiene-cyclohexadiene triblock copolymer obtained in Reference Example 6 and 3.3 g of trichlorosilane. As a result, a trimethoxysilane-modified polycyclohexadiene-butadiene triblock copolymer [Si-P(CHD-Bd-CHD) 2] having reactive groups (derived from trimethoxysilane) in an amount of 25 mmol (J=2.5) in terms of the amount of silicon atom was obtained.

EXAMPLE 16

(Modification of a cyclohexadiene-butadiene-cyclohexadiene triblock copolymer)

In an atmosphere of dried nitrogen gas, 100 parts by weight of the cyclohexadiene-butadiene-cyclohexadiene triblock copolymer obtained in Reference Example 5 and 0.28 part by weight of allyl glycidyl ether were added to 200 cm$^3$ of 1,2,4-trichlorobenzene (TCB) to thereby obtain a mixture. The obtained mixture was heated to 120° C. while stirring, to thereby completely dissolve the cyclohexadiene-butadiene-cyclohexadiene triblock copolymer and allyl glycidyl ether in TCB. To the resultant solution was gradually added 0.5 mmol of a 50% dilution product of benzoyl peroxide with dioctyl phthalate (Nyper BO, manufactured and sold by Nippon Oil & Fats Co., Ltd., Japan), and in the atmosphere of dried nitrogen gas, a reaction was performed at 120° C. for 2 hours. After completion of the reaction, the resultant reaction mixture was subjected to reprecipitation several times using acetone/TCB, to thereby obtain an allyl glycidyl ether-modified cycrohexadiene-butadiene-cyclohexadiene triblock copolymer. The modified cyclohexadiene-butadiene-cyclohexadiene triblock copolymer was heated under reduced pressure to remove the unreacted allyl glycidyl ether to thereby obtain an allyl glycidyl ether-modified cyclohexadiene-butadiene triblock copolymer [EP-P(CHD-Bd-CHD) 1] having reactive groups (derived from allyl glycidyl ether) in an amount of 2.3 mmol in terms of the amount of epoxy group (J=2.23). The determination of epoxy group was conducted by a method in which the allyl glycidyl ether-modified polycyclohexadiene was dissolved in TCB, a ring opening reaction was performed using methanol in the presence of sodium methoxide as a catalyst, and the amount of hydroxyl group was measured by the acetic anhydride method.

EXAMPLE 17
(Modification of a cyclohexadiene-butadiene-cyclohexadiene triblock copolymer)

Substantially the same procedure as in Example 10 was repeated, except that the cyclohexadiene-butadiene-cyclohexadiene triblock copolymer obtained in Reference Example 5 was used instead of the polymer obtained in Reference Example 3. As a result, a maleic anhydride-modified cyclohexadiene-butadiene-cyclohexadiene triblock copolymer [M-P(CHD-Bd-CHD)] was obtained. The content of reactive groups (derived from maleic anhydride) in the obtained M-P(CHD-Bd-CHD) was 0.2 wt % (J=2.04).

EXAMPLE 18
(Modification of a cyclohexadiene-butadiene-cyclohexadiene triblock copolymer)

The modification of the cyclohexadiene-butadiene-cyclohexadiene triblock copolymer obtained in Reference Example 5 was conducted in substantially the same manner as in Example 10, except that glycidyl methacrylate was used as a modifying agent instead of the maleic anhydride. As a result, a glycidyl methacrylate-modified cyclohexadiene-butadiene-cyclohexadiene triblock copolymer [G-P(CHD-Bd-CHD)] was obtained. The content of reactive groups (derived from glycidyl methacrylate) in the obtained G-P(CHD-Bd-CHD) was 0.33 wt % (J=2.24).

EXAMPLE 19
(Modification of a cyclohexadiene-styrene diblock copolymer)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) were added to 100 parts by weight of the cyclohexadiene-styrene diblock copolymer obtained in Reference Example 7 to thereby obtain a mixture. Irganox B215 was added as a stabilizer to the obtained mixture in an amount of 3,000 ppm, based on the weight of the polymer. While melt kneading the resultant mixture at 180 to 290° C., a reaction was performed to thereby obtain a maleic anhydride-modified cyclohexadiene-styrene diblock copolymer [M-P(CHD-St)]. The content of reactive groups (derived from maleic anhydride) in the obtained M-P(CHD-St) was 0.6 wt % (J=2.81) as measured in the same manner as in Example 4.

REFERENCE EXAMPLE 8
(Hydrogenation of a cyclohexadiene homopolymer)

A well dried 5 liter high-pressure autoclave having an electromagnetic induction agitator was purged with dried nitrogen gas by a conventional method.

2,800 g of cyclohexane and 60 g of 1,3-cyclohexadiene were charged in the autoclave. A polymerization catalyst (complex) obtained in Reference Example 1 was added to the autoclave in an amount of 10.48 mmol in terms of the amount of lithium atom. A polymerization reaction was performed at 30° C. for 4 hours, to thereby obtain a cyclohexadiene homopolymer. After that period of time, n-heptanol was added to the resultant reaction mixture, to thereby terminate the polymerization reaction.

To the reaction mixture was added a hydrogenation catalyst comprised of cobalt trisacetylacetonato [Co(acac)$_3$] and triisobutylaluminum (TIBAL) [Co(acac)$_3$/TIBAL molar ratio: 1/6], in an amount of 50 ppm, in terms of the amount of cobalt atom, based on the weight of the polymer. The autoclave was purged with hydrogen gas. The temperature of the autoclave was elevated to 180° C. and then, a hydrogenation reaction was performed under a hydrogen pressure of 35 kg/cm$^2$•G for 4 hours.

After completion of the hydrogenation reaction, the autoclave was cooled to room temperature, and the pressure in the autoclave was lowered to atmospheric pressure. The autoclave was purged with nitrogen gas, and TIBAL was deactivated, using a conventional technique, by adding methanol to the resultant reaction mixture.

To the reaction mixture was added a stabilizer [Irganox B215 (0037HX), manufactured and sold by CIBA GEIGY, Switzerland] and then, removal of the solvent was conducted by a conventional method, to thereby obtain a white powder of a hydrogenated cyclohexadiene homopolymer (PCHE).

Results of the measurement by $^1$H-NMR show that the degree of hydrogenation of the cyclohexene rings in the polymer chain structure was 100 mol %.

REFERENCE EXAMPLE 9
(Hydrogenation of a cyclohexadiene-butadiene diblock copolymer)

A well dried 5 liter high-pressure autoclave having an electromagnetic induction agitator was purged with dried nitrogen gas by a conventional method.

2,720 g of cyclohexane and 150 g of 1,3-cyclohexadiene were charged in the autoclave. A polymerization catalyst (complex) obtained in Reference Example 1 was added to the autoclave in an amount of 15.36 mmol in terms of the amount of lithium atom. A polymerization reaction was performed at 30° C. for 6 hours to thereby obtain a reaction mixture containing a cyclohexadiene homopolymer (step 1). Subsequently, 325 g of butadiene was charged in the autoclave, and a polymerization reaction was further performed at 60° C. for 1 hour to thereby obtain a cyclohexadiene-butadiene diblock copolymer (step 2).

After that period of time, the resultant reaction mixture containing the obtained polymer was transferred to a 200 ml autoclave. Then, the hydrogenation reaction was performed in substantially the same manner as in Reference Example 8, except that a hydrogenation catalyst comprised of titanocene dichloride (Cp$_2$TiCl$_2$) and triisobutylaluminum (TIBAL) (Cp$_2$TiCl$_2$/TIBAL molar-ratio: 1/6) was used in an amount of 100 ppm, in terms of the amount of titanium atom, based on the weight of the polymer. As a result, a partially hydrogenated cyclohexadiene-butadiene diblock copolymer (PCHD), in which the cyclohexadiene monomer units were not hydrogenated, was obtained.

Results of the measurement by $^1$H-NMR show that the degree of hydrogenation of the cyclohexene rings in the polymer chain structure was 0 mol %. With respect to the 1,2-vinyl bond segment and the 1,4-bond segment of the butadiene polymer block, the degrees of hydrogenation of the double bonds thereof were 91.6 mol % and 46.9 mol %, respectively.

REFERENCE EXAMPLE 10
(Hydrogenation of a cyclohexadiene-butadiene-cyclohexadiene triblock copolymer)

The polymerization reaction was performed in substantially the same manner as in Reference Example 9 to thereby obtain a cyclohexadiene-butadiene-cyclohexadiene triblock copolymer. The obtained polymer was subjected to hydrogenation reaction in substantially the same manner as in Reference Example 8, except that a hydrogenation catalyst comprised of titanocene dichloride ($Cp_2TiCl_2$) and triisobutylaluminum (TIBAL) ($Cp_2TiCl_2$/TIBAL molar ratio: 1/6) was used in an amount of 100 ppm, in terms of the amount of titanium atom, based on the weight of the polymer. As a result, a partially hydrogenated cyclohexadiene-butadiene triblock copolymer [P(CHD-EB-CHD)], in which the cyclohexadiene monomer units were not hydrogenated, was obtained.

Results of the measurement by $^1$H-NMR show that the degree of hydrogenation of the cyclohexene rings in the polymer chain structure was 0 mol %. With respect to the 1,2-vinyl bond segment and the 1,4-bond segment of the butadiene polymer block, the degrees of hydrogenation of the double bonds thereof were 94 mol % and 52 mol %, respectively.

REFERENCE EXAMPLE 11
(Hydrogenation of a cyclohexadiene-butadiene-cyclohexadiene triblock copolymer)

Substantially the same procedure as in Reference Example 10 was repeated, except that the amount of a hydrogenation catalyst comprised of titanocene dichloride ($Cp_2TiCl_2$) and triisobutylaluminum (TIBAL) ($Cp_2TiCl_2$/TIBAL molar ratio: 1/6) was changed to 10,000 ppm, in terms of the amount of titanium atom, based on the weight of the polymer. As a result, a hydrogenated cyclohexadiene-butadiene-cyclohexadiene triblock copolymer [P(CHE-EB-CHE)] was obtained.

Results of the measurement by $^1$H-NMR show that the degrees of hydrogenation of the cyclohexene rings in the polymer chain structure were each 100 mol %. With respect to each of the 1,2-vinyl bond segment and the 1,4-bond segment of the butadiene polymer block, the degree of hydrogenation of the double bonds thereof was 100 mol %.

REFERENCE EXAMPLE 12
(Hydrogenation of a cyclohexadiene-styrene diblock copolymer)

A well dried 5 liter high-pressure autoclave having an electromagnetic induction agitator was purged with dried nitrogen gas by a conventional method.

2,800 g of cyclohexane and 120 g of 1,3-cyclohexadiene were charged in the autoclave. A polymerization catalyst (complex) obtained in Reference Example 1 was added to the autoclave in an amount of 13 mmol in terms of the amount of lithium atom. A polymerization reaction was performed at 30° C. for 4 hours to thereby obtain a reaction mixture containing a cyclohexadiene homopolymer (step 1). Subsequently, 280 g of styrene was charged in the autoclave, and a polymerization reaction was further performed at 70° C. for 70 minutes to thereby obtain a cyclohexadiene-styrene diblock copolymer (step 2).

After that period of time, n-heptanol was added to the resultant reaction mixture to thereby terminate the polymerization reaction.

The resultant reaction mixture containing the obtained polymer was transferred to a 200 ml autoclave. To the reaction mixture was added a hydrogenation catalyst comprising 5 wt % of palladium (Pd) supported by barium sulfate ($BaSO_4$) in an amount of 200 wt %, based on the weight of the polymer.

The autoclave was purged with hydrogen gas. The temperature of the autoclave was elevated to 140° C. and then, a hydrogenation reaction was performed under a hydrogen pressure of 50 kg/cm$^2$•G for 5 hours.

After completion of the hydrogenation reaction, the autoclave was cooled to room temperature, and the pressure in the autoclave was lowered to atmospheric pressure. Then, the autoclave was purged with nitrogen gas. To the reaction mixture was added Irganox B215 (0037HX) (manufactured and sold by CIBA GEIGY, Switzerland) as a stabilizer and then, removal of the solvent was conducted by a conventional method, thereby obtaining a hydrogenated cyclohexadiene-styrene diblock copolymer [P(CHE-St)].

With respect to each of the cyclohexane rings and benzene rings in the polymer chain structure, the degree of hydrogenation was 100 mol %, as determined by $^1$H-NMR.

EXAMPLE 20

A well dried 5 liter high-pressure autoclave having an electromagnetic induction agitator was purged with dried nitrogen gas by a conventional method.

2,800 g of cyclohexane and 60 g of the trimethoxysilane-modified polycyclohexadiene obtained in Example 1 were charged in the autoclave. Then, a hydrogenation catalyst comprised of cobalt trisacetylacetonato [Co(acac)$_3$] and triisobutylaluminum (TIBAL) [Co(acac)$_3$/TIBAL molar ratio: 1/6] was added to the autoclave in an amount of 50 ppm, in terms of the amount of cobalt atom, based on the weight of the polymer. The autoclave was purged with hydrogen gas. The temperature of the autoclave was elevated to 180° C. and then, a hydrogenation reaction was performed under a hydrogen pressure of 35 kg/cm$^2$•G for 4 hours.

After completion of the hydrogenation reaction, the autoclave was cooled to room temperature, and the pressure in the autoclave was lowered to atmospheric pressure. Then, the autoclave was purged with nitrogen gas, and TIBAL was deactivated, using a conventional technique, by adding methanol to the resultant reaction mixture. As a result, a hydrogenated trimethoxysilane-modified polycyclohexadiene (Si-HPCHE1: J=2) was obtained.

Results of the measurement by $^1$H-NMR show that the degree of hydrogenation of the obtained polymer was 100 mol %.

EXAMPLE 21

Substantially the same procedure as in Example 20 was repeated, except that the trimethoxysilane-modified polycyclohexadiene obtained in Example 2 was used, to thereby obtain a hydrogenated trimethoxysilane-modified polycyclohexadiene (Si-HPCHE2: J=2).

Results of the measurement by $^1$H-NMR show that the degree of hydrogenation of the obtained polymer was 100 mol %.

EXAMPLES 22 to 25

Substantially the same procedure as in Example 20 was repeated, except that the polymers respectively obtained in Examples 8, 9, 14 and 15 were respectively used in Examples 22 to 25, and that a hydrogenation catalyst comprised of titanocene dichloride ($Cp_2TiCl_2$) and triisobutylaluminum (TIBAL) ($Cp_2TiCl_2$/TIBAL molar ratio: 1/6) was used in an amount of 10,000 ppm, in terms of the amount of titanium atom, based on the weight of the polymer, to thereby obtain hydrogenated polymers [Si-P(CHE-EB)1: J=2.2], [Si-P(CHE-EB)2: J=2.1], [Si-P(CHE-EB-CHE)1: J=2.3], and [Si-P(CHE-EB-CHE)2: J=2.5].

EXAMPLE 26

(Synthesis of a cyclohexadiene-methyl methacrylate diblock copolymer)

A well dried 100 ml Schlenk tube was purged with dried argon gas by a conventional method. 1.50 g of 1,3-cyclohexadiene, 18.0 g of cyclohexane and 2.0 g of n-hexane were charged in the Schlenk tube. A polymerization catalyst (complex of n-BuLi and TMEDA) obtained in Reference Example 1 was added to the Schlenk tube in an amount of 0.07 mmol in terms of the amount of lithium atom, and a polymerization reaction was performed at 30° C. for 4 hours in an atmosphere of dried argon gas to thereby obtain a cyclohexadiene homopolymer. Subsequently, the resultant polymerization reaction mixture was cooled to −10° C. Then, 1.50 g of methyl methacrylate (MMA) was added to the polymerization reaction mixture, and a polymerization reaction was further performed at −10° C. for 3 hours to thereby obtain a cyclohexadiene-methyl methacrylate diblock copolymer.

After that period of time, a 10 wt % solution of BHT [2,6-bis(tert-butyl)-4-methylphenol] in methanol was added to the resultant reaction mixture to thereby terminate the polymerization reaction. Then, a large amount of a mixed solvent of methanol and hydrochloric acid was added to the resultant reaction mixture, thereby separating a polymer formed therein. The separated polymer was washed with methanol, followed by drying at 80° C. in vacuo, thereby obtaining a white mass of the cyclohexadiene-methyl methacrylate diblock copolymer in a yield of 81 wt %.

The $\overline{Mn}$ of the obtained cyclohexadiene-methyl methacrylate diblock copolymer was 34,500. The $\overline{Mw}/\overline{Mn}$ was 1.89.

EXAMPLE 27

Substantially the same procedure as in Example 4 was repeated, except that the hydrogenated cyclohexadiene homopolymer obtained in Reference Example 8 was used, to thereby obtain a maleic anhydride-modified hydrogenated cyclohexadiene homopolymer (M-PCHE). The content of reactive groups (derived from maleic anhydride) in the obtained M-PCHE was 0.29 wt % (J=1.4) as measured by titration using sodium methylate.

EXAMPLE 28

2.5 Parts by weight of maleic anhydride and 0.5 part by weight of 2,5-dimethyl-2,5-di(tert-butyl peroxy)hexane having a purity of 90% or more (Perhexa 25B, manufactured and sold by Nippon Oil & Fats Co., Ltd., Japan) were added to 100 parts by weight of the hydrogenated cyclohexadiene homopolymer obtained in Reference Example 8 to thereby obtain a mixture. Then, Irganox B215 was added as a stabilizer to the obtained mixture in an amount of 3,000 ppm, based on the weight of the polymer. While melt kneading the resultant mixture at 180 to 290° C., a reaction was performed to thereby obtain a maleic anhydride-modified hydrogenated cyclohexadiene homopolymer (M-PCHE). The content of reactive groups (derived from maleic anhydride) in the obtained M-PCHE was 0.5 wt % (J=2.5).

EXAMPLE 29

Substantially the same procedure as in Example 27 was repeated, except that glycidyl methacrylate was used as a modifying agent instead of the maleic anhydride, to thereby obtain a glycidyl methacrylate-modified hydrogenated cyclohexadiene homopolymer (G-PCHE). The content of reactive groups (derived from glycidyl methacrylate) in the obtained G-PCHE was 0.8 wt % (J=2.77).

EXAMPLE 30

2.5 Parts by weight of γ-methacryloyloxypropyl-trimethoxysilane (KBM-503, manufactured and sold by The Shin-Etsu Chemical Co., Ltd., Japan) and 0.5 part by weight of 2,5-dimethyl-2,5-di(tert-butyl peroxy)hexane having a purity of 90% or more (Perhexa 25B, manufactured and sold by Nippon Oil & Fats Co., Ltd., Japan) were added to 100 parts by weight of the hydrogenated cyclohexadiene homopolymer obtained in Reference Example 8 to thereby obtain a mixture. Irganox B215 was added as a stabilizer to the obtained mixture in an amount of 3,000 ppm, based on the weight of the polymer. While melt kneading the resultant mixture at 180 to 290° C., a reaction was performed to thereby obtain a γ-methacryloyloxy-propyltrimethoxysilane-modified hydrogenated cyclohexadiene homopolymer (Si-PCHE: J=2.78).

EXAMPLE 31

In an atmosphere of dried nitrogen gas, 100 parts by weight of the partially hydrogenated cyclohexadiene-butadiene diblock copolymer obtained in Reference Example 9 and 0.58 part by weight of allyl glycidyl ether were added to 200 cm³ of 1,2,4-trichlorobenzene (TCB) to thereby obtain a mixture. The obtained mixture was heated to 120° C. while stirring, to thereby completely dissolve the cyclohexadiene homopolymer and allyl glycidyl ether in TCB. To the resultant solution was gradually added 0.5 mmol of a 50% dilution product of benzoyl peroxide with dioctyl phthalate (Nyper BO, manufactured and sold by Nippon Oil & Fats Co., Ltd., Japan), and in the atmosphere of dried nitrogen gas, a reaction was performed at 120° C. for 2 hours. After completion of the reaction, the resultant reaction mixture was subjected to reprecipitation several times using acetone/TCB to thereby obtain an allyl glycidyl ether-modified partially hydrogenated cyclohexadiene-butadiene diblock copolymer. The modified partially hydrogenated cyclohexadiene-butadiene diblck copolymer was heated under reduced pressure to remove the unreacted allyl glycidyl ether, thereby obtaining an allyl glycidyl ether-modified partially hydrogenated cyclohexadiene-butadiene diblock copolymer [EP-P(CHD-EB)1] having reactive groups (derived from allyl glycidyl ether) in an amount of 4.9 mmol in terms of the amount of epoxy group (J=2.35). The determination of epoxy group was conducted by a method in which the allyl glycidyl ether-modified polycyclohexadiene was dissolved in TCB, a ring opening reaction was performed using methanol in the presence of sodium methoxide as a catalyst, and the amount of hydroxyl group was measured by the acetic anhydride method.

EXAMPLE 32

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) were added to 100 parts by weight of the partially hydrogenated cyclohexadiene-butadiene diblock copolymer obtained in Reference Example 9 to thereby obtain a mixture. Irganox B215 was added as a stabilizer to the obtained mixture in an amount of 3,000 ppm, based on the weight of the polymer.

While melt kneading the resultant mixture at 180 to 290° C., a reaction was performed to thereby obtain a maleic anhydride-modified partially hydrogenated cyclohexadiene-butadiene diblock copolymer [M-P(CHD-EB)].

The content of reactive groups (derived from maleic anhydride) in the obtained M-P(CHD-EB) was 0.43 wt % (J=2.08) as measured in the same manner as in Example 4.

EXAMPLE 33

The modification of the partially hydrogenated cyclohexadiene-butadiene diblock copolymer was conducted in substantially the same manner as in Example 32, except that glycidyl methacrylate was used as a modifying agent instead of the maleic anhydride. As a result, a glycidyl methacrylate-modified partially hydrogenated cyclohexadiene-butadiene diblock copolymer [G-P(CHD-EB)] was obtained. The content of reactive groups (derived from glycidyl methacrylate) in the obtained G-P(CHD-EB) was 0.58 wt % (J=1.94).

EXAMPLE 34

Substantially the same procedure as in Example 31 was repeated, except that the partially hydrogenated cyclohexadiene-butadiene-cyclohexadiene triblock copolymer obtained in Reference Example 10 was used. As a result, an allyl glycidyl ether-modified partially hydrogenated cyclohexadiene-butadiene-cyclohexadiene triblock copolymer [EP-P(CHD-EB-CHD)1: J=2.12] was obtained.

EXAMPLE 35

Substantially the same procedure as in Example 32 was repeated, except that the partially hydrogenated cyclohexadiene-butadiene-cyclohexadiene triblock copolymer obtained in Reference Example 10 was used. As a result, a maleic anhydride-modified partially hydrogenated cyclohexadiene-butadiene-cyclohexadiene triblock copolymer [M-P(CHD-EB-CHD)] was obtained. The content of reactive groups (derived from maleic anhydride) in the obtained M-P(CHD-EB-CHD) was 0.38 wt % (J=3.88).

EXAMPLE 36

The modification of the partially hydrogenated cyclohexadiene-butadiene-cyclohexadiene triblock copolymer was conducted in substantially the same manner as in Example 35, except that glycidyl methacrylate was used as a modifying agent instead of the maleic anhydride. As a result, a glycidyl methacrylate-modified partially hydrogenated cyclohexadiene-butadiene-cyclohexadiene triblock copolymer [G-P(CHD-EB-CHD)] was obtained. The content of reactive groups (derived from glycidyl methacrylate) in the obtained G-P(CHD-EB-CHD) was 0.38 wt % (J=2.59).

EXAMPLE 37

Substantially the same procedure as in Example 5 was repeated, except that the partially hydrogenated cyclohexadiene-butadiene-cyclohexadiene triblock copolymer obtained in Reference Example 10 was used. As a result, a maleic anhydride-modified partially hydrogenated cyclohexadiene-butadiene-cyclohexadiene triblock copolymer [M-P(CHD-EB-CHD)] was obtained. The content of maleic anhydride groups in the obtained M-P(CHD-EB-CHD) was 0.13 wt % (J=1.33).

EXAMPLE 38

The modification of the partially hydrogenated cyclohexadiene-butadiene-cyclohexadiene triblock copolymer obtained in Reference Example 10 was conducted in substantially the same manner as in Example 37, except that glycidyl methacrylate is used as a modifying agent instead of the maleic anhydride. As a result, a glycidyl methacrylate-modified, partially hydrogenated cyclohexadiene-butadiene-cyclohexadiene triblock copolymer [G-P(CHD-EB-CHD)] was obtained. The content of reactive groups (derived from glycidyl methacrylate) in the obtained G-P(CHD-EB-CHD) was 0.24 wt % (J=1.63).

EXAMPLES 39 to 45

The curable, cyclic conjugated diene polymer resins respectively obtained in Reference Examples 1 to 6 and Example 26 were individually subjected to electron beam irradiation using a cascade type electron beam accelerator under conditions wherein the irradiation dose was 10 Mrad, the atmosphere employed was nitrogen atmosphere and the temperature employed was room temperature, to thereby obtain cured resins. With respect to each of the obtained cured resins, samples thereof were, respectively, immersed in methanol, chloroform and 35 wt % hydrochloric acid and then, allowed to stand at 23° C. for 24 hours. Then, with respect to each of the samples, the weight reduction ratio (%) was calculated, and the calculated value was used as a yardstick for the resistance of the cured resin to chemicals. Results are shown in Table 1. The resins cured by electron beam irradiation had remarkably improved resistance to chemicals, as compared to the non-cured resins.

EXAMPLE 46

95 Parts by weight of the allyl glycidyl ether-modified polycyclohexadiene obtained in Example 3 and 5 parts by weight of ethylenediamine (hereinafter, frequently referred to simply as "ED") were dissolved in trichloroethylene, and the resultant solution was subjected to casting, to thereby obtain a film having a thickness of about 100 pm. The obtained film had a smooth surface, which indicates that the allyl glycidyl ether-modified polycyclohexadiene had an excellent film-forming ability. 18 Films, each obtained in the same manner as mentioned above, were stacked one upon another, and then heated from room temperature to 200° C. The temperature of the stacked films was maintained at 200° C. for 30 minutes, followed by cooling, to thereby obtain a cured resin sheet having a thickness of about 1.5 mm.

Samples of the obtained cured resin sheet were, respectively, immersed in methanol, chloroform and 35 wt % hydrochloric acid and then, allowed to stand at 23° C. for 24 hours. Then, with respect to each of the samples, the weight reduction ratio (%) was calculated, and the calculated value was used as a yardstick for the resistance of the cured resin to chemicals. Results are shown in Table 2.

EXAMPLES 47 to 52

Substantially the same procedure as in Example 46 was repeated, except that the polymers respectively obtained in Examples 4 to 6, 13, 18 and 29 were individually used to thereby obtain cured resin sheets. With respect to each of the obtained cured resin sheets, the resistance to chemicals was evaluated. Results are shown in Table 2.

EXAMPLE 53

To 100 parts by weight of the trimethoxysilane-modified polycyclohxadiene obtained in Example 2 were added 20 parts by weight of chlorinated paraffin, 3 parts by weight of silicic acid anhydride and 2 parts by weight of dibutyltin maleate, and the resultant was vigorously stirred to thereby obtain a mixture. The obtained mixture was applied to a polyethylene film and then, allowed to stand for 14 days to thereby obtain a 2 mm-thick cured resin sheet formed on the polyethylene film. With respect to the obtained cured resin sheet, samples thereof were, respectively, immersed in methanol, chloroform and 35 wt % hydrochloric acid and then, allowed to stand at 23° C. for 24 hours. Then, with respect to each of the samples, the weight reduction ratio (%) was calculated, and the calculated value was used as a yardstick for the resistance of the cured resin sheet to chemicals. Results are shown in Table 3.

EXAMPLES 54 to 59

Substantially the same procedure as in Example 53 was repeated, except that the polymers respectively obtained in Examples 20 to 25 were individually used to thereby obtain cured resin sheets. Then, with respect to each of the obtained cured resin sheets, the resistance to chemicals was evaluated. Results are shown in Table 3.

COMPARATIVE EXAMPLES 1 to 8

Substantially the same procedure as in Example 53 was repeated, except that the cyclic conjugated diene polymers respectively obtained in Reference Examples 1 to 3, 5 and 6, and the hydrogenated polymers respectively obtained in Reference Examples 8 to 10 were individually used to thereby obtain cured resin sheets. Then, with respect to each of the obtained cured resin sheets, the resistance to chemicals was evaluated. Results are shown in Table 4.

COMPARATIVE EXAMPLE 9

In a 1 liter autoclave having an agitator which had been purged with nitrogen gas, were charged 0.95 g of potassium hydroxide, 1.64 g of 1,2-propanediol and 464 g of propylene oxide. The temperature of the autoclave was elevated to 100° C., and a polymerization reaction was performed at 100° C. for 15 hours to thereby obtain a reaction mixture containing a polymer having an $\overline{Mn}$ of 3,100.

To the reaction mixture was added 11 g of metallic potassium was added, and a reaction was performed at 80° C. for 2 hours while stirring. Then, methylene chloride was added to the resultant reaction mixture, and a reaction was further performed at 70° C. for 4 hours. Subsequently, 13 g of allyl chloride was added to the reaction mixture, and a reaction was further performed at 40° C. for 2 hours to thereby obtain a polymer having an $\overline{Mn}$ of 6,900 and having an allyl ether group at both terminals thereof.

The resultant reaction mixture containing the obtained polymer was transferred to a reactor having an agitator. 19.4 g of methyldichlorosilane and 13 ml of a solution of chloroplatinic acid in isopropanol/tetrahydrofuran (the concentration of chloroplatinic acid: 600 ppm) were added to the above reaction mixture, and a reaction was performed at 90° C. for 3 hours. Then, methanol was added to the resultant reaction mixture to thereby obtain a polymer having a methyldimethoxysilyl group.

To 100 parts by weight of the obtained polymer were added 20 parts by weight of chlorinated paraffin, 3 parts by weight of silicic acid anhydride and 2 parts by weight of dibutyltin maleate, and the resultant was vigorously stirred to thereby obtain a mixture. The obtained mixture was applied to a polyethylene film and then, allowed to stand for 14 days to thereby obtain a 2 mm-thick cured resin sheet formed on the polyethylene film. With respect to the obtained cured resin sheet, samples thereof were, respectively, immersed in methanol, chloroform and 35 wt % hydrochloric acid and then, allowed to stand at 23° C. for 24 hours. Then, with respect to each of the samples, the weight reduction ratio (%) was calculated, and the calculated value was used as a yardstick for the resistance of the cured resin sheet to chemicals. Results are shown in Table 4.

COMPARATIVE EXAMPLE 10

Substantially the same procedure as in Example 11 was repeated, except that 5 parts by weight of maleic anhydride was as a modifying agent, to thereby obtain a maleic anhydride-modified cyclohexadiene-butadiene diblock copolymer. The content of reactive groups (derived from maleic anhydride) in the obtained polymer was 1.4 wt % (J=6.8). The curing operation of the obtained polymer was conducted in substantially the same manner as in Example 45. As a result, it was found that the obtained polymer had a poor film-forming ability, so that a cured resin film could not be obtained.

COMPARATIVE EXAMPLE 11

Substantially the same procedure as in Example 17 was repeated, except that 5 parts by weight of maleic anhydride was used as a modifying agent, to thereby obtain a maleic anhydride-modified partially hydrogenated cyclohexadiene-butadiene diblock copolymer. The content of reactive groups (derived from maleic anhydride) in the obtained polymer was 1.4 wt % (J=14.3). The curing operation of the obtained polymer was conducted in substantially the same manner as in Example 45. As a result, it was found that the obtained polymer had a poor film-forming ability, so that a cured resin film could not be obtained.

COMPARATIVE EXAMPLE 12

Substantially the same procedure as in Example 35 was repeated, except that 5 parts by weight of maleic anhydride was used as a modifying agent, to thereby obtain a maleic anhydride-modified partially hydrogenated cyclohexadiene-butadiene diblock copolymer. The content of reactive groups (derived from maleic anhydride) in the obtained polymer was 1.0 wt % (J=9.9). The curing operation of the obtained polymer was conducted in substantially the same manner as in Example 45. As a result, it was found that the obtained polymer had a poor film-forming ability, so that a cured resin film could not be obtained.

EXAMPLE 60

(Preparation of a polymerization catalyst)

In an atmosphere of dried argon gas, a given amount of tetramethylethylenediamine (TMEDA) was dissolved in a mixed solvent of cyclohexane and n-hexane having a cyclohexane/n-hexane ratio of 9/1 (V/V). The resultant solution was cooled to and maintained at 10° C. Then, in the atmosphere of dried argon gas, an n-hexane solution of n-butyllithium (n-BuLi) was gradually added to the solution of TMEDA in cyclohexane/n-hexane in an amount such as would provide a TMEDA/n-BuLi molar ratio of 1/4. As a result, a complex of TMEDA/n-BuLi to be used as a polymerization catalyst was obtained.

(Polymerization for producing a base polymer)

A well dried 100 ml Schlenk tube was purged with dried argon gas by a conventional method. 3.00 g of 1,3-cyclohexadiene and 20.0 g of cyclohexane were charged in the Schlenk tube. While maintaining the temperature of the resultant solution at 30° C., the above-obtained polymerization catalyst (complex) of TMEDA/n-BuLi was added to the solution in an amount of 0.07 mmol in terms of the amount of lithium atom, and a polymerization reaction was performed for 2 hours in a dried argon atmosphere.

After that period of time, a 10 wt % solution of 2,6-bis (t-butyl)-4-methylphenol (BHT) in methanol was added to the reaction mixture, to thereby terminate the polymerization reaction. Then, the resultant reaction mixture was treated with a large amount of a mixture of methanol and hydrochloric acid, thereby separating a polymer formed in the reaction mixture. The separated polymer was washed with methanol and then, dried at 80° C. in vacuo, thereby obtaining a white mass of the cyclohexadiene homopolymer in a yield of 100 A.

The $\overline{Mn}$ of the obtained homopolymer was 9,200. The $\overline{Mw}/\overline{Mn}$ was 1.03.

In an atmosphere of dried nitrogen gas, 100 parts by weight of the obtained cyclohexadiene homopolymer, 0.75 part by weight of methyldichlorosilane and 0.03 part by weight of chloroplatinic acid were added to 200 cm$^3$ of toluene to thereby obtain a mixture. The obtained mixture was stepwise heated to 100° C. and a reaction was performed at 100° C. for 4 hours to thereby obtain a reaction mixture containing a polymer having reactive groups (derived from methyldichlorosilane) in an amount of 22 mmol in terms of the amount of silicon atom. This means that the average number of silicon atoms per molecule of the polymer was 2 (J=2). The determination of silicon was conducted by a method in which a part of the reaction mixture containing the obtained polymer was sampled, the unreacted trichlorosilane was removed from the sampled reaction mixture, and the amount of chloro group was measured by titration using a 1 N aqueous solution of sodium hydroxide.

200 cm$^3$ of methanol was added to the reaction mixture containing the obtained polymer, and a reaction was performed, while refluxing the methanol to thereby obtain a methyldimethoxysilane-modified polycyclohexadiene (Si-PCHD).

For determining the number average molecular weight and weight average molecular weight (and also the molecular weight distribution) of the polymer, the polymer was dissolved in 1,2,4-trichlorobenzene (TCB), and the resultant solution was subjected to gel permeation chromatography (GPC). The number average molecular weight and weight average molecular weight of the polymer were determined using a calibration curve obtained from standard polystyrenes.

(Hydrogenation of a base polymer)

A well dried 5 liter high-pressure autoclave having an electromagnetic induction agitator was purged with dried nitrogen gas by a conventional method.

In an atmosphere of dried nitrogen gas, 2,800 g of cyclohexane and 60 g of the Si-PCHD obtained above were charged in the autoclave.

To the resultant mixture was added a hydrogenation catalyst comprised of Co(acac)$_3$ and triisobutylaluminum (TIBAL) [Co(acac)$_3$/TIBAL molar ratio: 1/6], in an amount of 50 ppm, in terms of the amount of cobalt atom, based on the weight of the polymer. The autoclave was purged with hydrogen gas. The temperature of the autoclave was elevated to 180° C. and then, a hydrogenation reaction was performed under a hydrogen pressure of 35 kg/cm$^2$•G for 4 hours.

After completion of the hydrogenation reaction, the autoclave was cooled to room temperature, and the pressure in the autoclave was lowered to atmospheric pressure. The autoclave was purged with nitrogen gas, and TIBAL was deactivated, using a conventional technique, by adding methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a methyldimethoxysilane-modified polycyclohexane (Si-PCHEI).

Results of the measurement by $^1$H-NMR show that the degree of hydrogenation of the cyclohexene rings in the polymer chain structure of the obtained polymer was 100 mol %.

EXAMPLE 61

Substantially the same procedure as in Example 60 was repeated, except that trichlorosilane was used as a modifying agent instead of the methyldichlorosilane. As a result, a methyltrimethoxysilane-modified polycyclohexane (Si-PCHE2: J=2.5) was obtained.

EXAMPLE 62

A well dried 5 liter high-pressure autoclave having an electromagnetic induction agitator was purged with dried nitrogen gas by a conventional method.

In an atmosphere of dried nitrogen gas, 2,800 g of cyclohexane and 60 g of 1,3-cyclohexadiene were charged in the autoclave. Then, a polymerization catalyst obtained in Reference Example 1 was added to the autoclave in an amount of 10.48 mmol in terms of the amount of lithium atom. A polymerization reaction was performed at 30° C. for 30 minutes to thereby obtain a cyclohexadiene homopolymer (step 1). Subsequently, 280 g of butadiene was charged in the autoclave, and a polymerization reaction was performed at 60° C. for 10 minutes to thereby obtain a cyclohexadiene-butadiene block copolymer (step 2). To the resultant reaction mixtre containing the obtained polymer was added 60 g of 1,3-cyclohexadiene, and a polymerization reaction was performed at 30° C. for 0.5 hour to thereby obtain a cyclohexadiene-butadiene-cyclohexadiene triblock-copolymer (step 3).

After that period of time, n-heptanol was added to the resultant reaction mixture to thereby terminate the polymerization reaction. The $\overline{Mn}$ of the obtained cyclohexadiene-butadiene-cyclohexadiene triblock copolymer was 10,000. The M-/ME was 1.01.

In an atmosphere of dried nitrogen gas, 100 parts by weight of the obtained cyclohexadiene-butadiene-cyclohexadiene triblock copolymer, 3.3 parts by weight of methyldichlorosilane and 0.03 part by weight of chloroplatinic acid were added to 200 cm$^3$ of toluene to thereby obtain a mixture. The obtained mixture was stepwise heated to 100° C. and a reaction was performed at 100° C. for 4 hours to thereby obtain a polymer having reactive groups (derived from methyldichlorosilane) in an amount of 20 mmol in terms of the amount of silicon atom (J=2). This means that the average number of silicon per molecule of the polymer is 2.

200 cm$^3$ of methanol was added to the reaction mixture containing the obtained polymer, and a reaction was performed, while refluxing the methanol, to thereby obtain a methyldimethoxysilane-modified cyclohexadiene-butadiene-cyclohexadiene triblock copolymer [Si-P(CHD-Bd-CHD)].

2,800 g of cyclohexane and 160 g of the obtained [Si-p (CHD-Bd-CHD)] were charged in the same autoclave as that used in Example 1. To the resultant mixture was added a hydrogenation catalyst comprised of titanocene dichloride ($Cp_2TiCl_2$) and triisobutylaluminum (TIBAL) (($Cp_2TiCl_2$/TIBAL molar ratio: 1/6), in an amount of 10,000 ppm, in terms of the amount of titanium atom, based on the weight of the polymer. The autoclave was purged with hydrogen gas. The temperature of the autoclave was elevated to 180° C. and then, a hydrogenation reaction was performed under a hydrogen pressure of 35 kg/cm²·G for 4 hours.

After completion of the hydrogenation reaction, the autoclave was cooled to room temperature, and the pressure in the autoclave was lowered to atmospheric pressure. The autoclave was purged with nitrogen gas, and TIBAL was deactivated, using a conventional technique, by adding methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a methyldimethoxysilane-modified cyclohexane-hydrogenated butadiene-cyclohexane triblockcopolymer [Si-P(CHE-EB-CHE)].

With respect to each of the cyclohexene rings and the double bonds of the butadiene polymer block in the polymer chain structure of the obtained triblockcopolymer, the degree of hydrogenation was 100 mol %, as determined by $^1$H-NMR

EXAMPLE 63

To 100 parts by weight of the polymer obtained in Example 60 were added 20 parts by weight of chlorinated paraffin, 3 parts by weight of silicic acid anhydride and 2 parts by weight of dibutyltin maleate, and the resultant was vigorously stirred to thereby obtain a mixture. The obtained mixture was applied to a polyethylene film and then allowed to stand for 14 days to thereby obtain a 2 mm-thick cured resin sheet formed on the polyethylene film.

With respect to the obtained cured resin sheet, samples thereof were, respectively, immersed in methanol, chloroform and 35 wt % hydrochloric acid and then, allowed to stand at 23° C. for 24 hours. With respect to each of the samples, the weight reduction ratio (%) was calculated. Then, each of the samples was individually placed in a hot-air drier having a temperature of 100° C., and the yellowness of each sample was evaluated. Results are shown in Table 5.

EXAMPLES 64 and 65

Substantially the same procedure as in Example 63 was repeated, except that the polymers respectively obtained in Examples 61 and 62 were individually used instead of the polymer obtained in Example 60, to thereby obtain cured resin sheets. With respect to each of the obtained cured resin sheets, the resistance to chemicals was evaluated. Results are shown in Table 5.

COMPARATIVE EXAMPLE 13

In a 1 liter autoclave having an agitator, which had been purged with nitrogen gas, were charged 0.95 g of potassium hydroxide, 1.64 g of 1,2-propanediol and 464 g of propylene oxide. The temperature of the autoclave was elevated to 100° C., and a polymerization reaction was performed at 100° C. for 15 hours to thereby obtain a reaction mixture containing a polymer having an $\overline{Mn}$ of 3,100.

To the reaction mixture was added 11 g of metallic potassium, and a reaction was performed at 80° C. for 2 hours while stirring. Then, methylene chloride was added to the resultant reaction mixture, and a reaction was further performed at 70° C. for 4 hours. Subsequently, to the resultant mixture was added 13 g of allyl chloride, and a reaction was further performed at 40° C. for 2 hours to thereby obtain a polymer having an $\overline{Mn}$ of 6,900 and having an allyl ether group at both terminals thereof.

The resultant reaction mixture containing the obtained polymer was transferred to a reactor having an agitator. 19.4 g of methyldichlorosilane and 13 ml of a solution of chloroplatinic acid in isopropanol/tetrahydrofuran (the concentration of chloroplatinic acid: 600 ppm) were added to the above reaction mixture, and a reaction was performed at 90° C. for 3 hours. Then, methanol was added to the resultant reaction mixture to thereby obtain a polymer having a methyldimethoxysilyl group.

To 100 parts by weight of the obtained polymer were added 20 parts by weight of chlorinated paraffin, 3 parts by weight of silicic acid anhydride and 2 parts by weight of dibutyltin maleate, and the resultant was vigorously stirred to thereby obtain a mixture. The obtained mixture was applied to a polyethylene film and then, allowed to stand for 14 days to thereby obtain a 2 mm-thick cured resin sheet formed on the polyethylene film. With respect to the obtained cured resin sheet, samples thereof were, respectively, immersed in methanol, chloroform and 35 wt % hydrochloric acid and then, allowed to stand at 23° C. for 24 hours. With respect to each of the samples, the weight reduction ratio (%) was calculated. Then, each of the samples was placed in a hot-air dryer having a temperature of 100° C., and the yellowness of each sample was evaluated. Results are shown in Table 5.

REFERENCE EXAMPLE 13

(Synthesis of a cyclohexadiene-isoprene-cyclohexadiene triblock copolymer)

Production of a cyclohexadiene homopolymer was conducted in substantially the same manner as in Reference Example 3. That is, the production of the homopolymer was conducted as follows. 2,800 g of cyclohexane and 60 g of 1,3-cyclohexadiene were charged in the same autoclave as used in Reference Exampl 3. A polymerization catalyst (complex) obtained in Reference Example 1 was added to the autoclave in an amount of 10.48 mmol in terms of the amount of lithium atom. A polymerization reaction was performed at 30° C. for 0.5 hour to thereby obtain a reaction mixture containing a cyclohexadiene homopolymer (step 1). Subsequently, 20 g of isoprene was charged in the autoclave, and a polymerization reaction was further performed at 60° C. for 10 minutes to thereby obtain a cyclohexadiene-isoprene diblock copolymer (step 2). Subsequently, 60 g of 1,3-cyclohexadiene was further charged in the autoclave, and a reaction was further performed at 80° C. for 0.5 hour to thereby obtain a cyclohexadiene-isoprene-cyclohexadiene triblock copolymer (step 3).

After that period of time, n-heptanol was added to the resultant reaction mixture, to thereby terminate the polymerization reaction. The post-polymerization treatment was conducted in the same manner as in Reference Example 3 to thereby obtain a cyclohexadiene-isoprene-cyclohexadiene triblock copolymer having an $\overline{Mn}$ of 90,800 and an $\overline{Mw}/\overline{Mn}$ of 1.02.

EXAMPLE 66

(Modification of a cyclohexadiene-isoprene-cyclohexadiene triblock copolymer)

Substantially the same procedure as in Example 8 was repeated, except that the cyclohexadiene-isoprenecyclohexadiene triblock copolymer obtained in Reference Example 13 was used, and that the amount of trichlorosilane as a modifying agent was changed to 3.5 g, to thereby obtain a trimethoxysilane-modified cyclohexadiene-isoprene-cyclohexadiene triblock copolymer having reactive groups (derived from trimethoxysilane) in an amount of 25 mmol in terms of the amount of silicon atom [Si-P(CHD-IP-CHD): J=2.5].

EXAMPLE 67

Substantially the same procedure as in Example 20 was repeated, except that the polymer obtained in Example 66 was used, to thereby obtain a hydrogenated trimethoxysilane-modified cyclohexadiene-isoprene triblock copolymer [Si-P(CHE-HIP-CHE): J=2.5]. The degree of hydrogenation of the obtained polymer was 100 mol %.

EXAMPLE 68

Substantially the same procedure as in Example 53 was repeated, except that the polymer obtained in Example 67 was used, to thereby obtain a cured resin sheet. Then, with respect to the obtained cured resin sheet, the resistance to chemicals was evaluated in the same manner as in Example 53. As a result, the weight reduction ratios (%) of the samples respectively immersed in methanol, chloroform and immersion and 35 wt % hydrochloric acid were 0.09%, 0.06% and 0.02%, respectively. The results show that the cured resin had excellent resistance to chemicals.

INDUSTRIAL APPLICABILITY

The novel curable resin of the present invention, which comprises at least one modified cyclic monomer unit-containing polymer has excellent thermal properties. Further, when the curable resin of the present invention comprises a copolymer, the content of comonomer and the configuration of copolymer can be appropriately selected in accordance with desired thermal and mechanical properties of the curable resin. Therefore, the curable resin of the present invention can be advantageously used either singly or in combination with inorganic materials as well as another resin material, depending on the intended use thereof. Specifically, the curable resin of the present invention can be advantageously used as a plastic; a thermoplastic elastomer; a crosslinked elastomer; a fiber; a sheet; a film; a material for a tube, a food container, a packaging material, a tire, a belt, and the like; an insulating material, an organic glass; an adhesive; a paint; a sealant; a modifier for other resins and an additive for a cement, in a wide variety of application fields, such as automobile parts, electric parts, electronic parts, general miscellaneous goods, food containers, packaging materials, medical equipment parts, construction and civil engineering.

TABLE 1

| Examples | Curable, polymer resin | Weight reduction ratio (%) | | |
|---|---|---|---|---|
| | | In CHCl$_3$ | In MeOH | In 35 wt % Hydrochloric acid |
| Example 39 | PCHD1 | 0.01 | 0.01 | 0.01 |
| Example 40 | PCHD2 | 0.03 | 0.02 | 0.02 |
| Example 41 | P(CHD-Bd)1 | 0.03 | 0.02 | 0.01 |
| Example 42 | P(CHD-Bd)2 | 0.04 | 0.03 | 0.02 |
| Example 43 | P(CHD-Bd-CHD)1 | 0.02 | 0.01 | 0.01 |
| Example 44 | P(CHD-Bd-CHD)2 | 0.03 | 0.02 | 0.02 |

TABLE 1-continued

| Examples | Curable, polymer resin | Weight reduction ratio (%) | | |
|---|---|---|---|---|
| | | In CHCl$_3$ | In MeOH | In 35 wt % Hydrochloric acid |
| Example 45 | CHD-MMA | 0.05 | 0.04 | 0.01 |

- PCHD1: Polycyclohexadiene ($\overline{Mn}$ = 44,500)
- PCHD2: Polycyclohexadiene ($\overline{Mn}$ = 9,200)
- P(CHD-Bd)1: Cyclohexadiene-butadiene diblock copolymer ($\overline{Mn}$ = 47,500)
- P(CHD-Bd)2: Cyclohexadiene-butadiene diblock copolymer ($\overline{Mn}$ = 5,700)
- P(CHD-Bd-CHD)1: Cyclohexadiene-butadiene-cyclohexadiene triblock copolymer ($\overline{Mn}$ = 97,000)
- P(CHD-Bd-CHD)2: Cyclohexadiene-butadiene-cyclohexadiene triblock copolymer ($\overline{Mn}$ = 10,000)
- CHD-MMA: Cyclohexadiene-methylmethacrilate diblock copolymer

TABLE 2

| Examples | Curable, polymer resin | Weight reduction ratio (%) | | |
|---|---|---|---|---|
| | | In CHCl$_3$ | In MeOH | In 35 wt % Hydrochloric acid |
| Example 46 | EP-PCHD | 0.04 | 0.05 | 0.03 |
| Example 47 | M-PCHD1 | 0.01 | 0.01 | 0.01 |
| Example 48 | M-PCHD2 | 0.02 | 0.02 | 0.02 |
| Example 49 | G-PCHD | 0.02 | 0.04 | 0.01 |
| Example 50 | G-P(CHD-Bd) | 0.03 | 0.06 | 0.02 |
| Example 51 | G-P(CHD-Bd-CHD)1 | 0.04 | 0.05 | 0.01 |
| Example 52 | G-PCHE | 0.08 | 0.09 | 0.03 |

TABLE 3

| Examples | Curable, polymer resin | Weight reduction ratio (%) | | |
|---|---|---|---|---|
| | | In CHCl$_3$ | In MeOH | In 35 wt % Hydrochloric acid |
| Example 53 | Si-PCHD2 | 0.03 | 0.03 | 0.01 |
| Example 54 | Si-PCHE1 | 0.05 | 0.06 | 0.02 |
| Example 55 | Si-PCHE2 | 0.06 | 0.07 | 0.01 |
| Example 56 | Si-P(CHD-Bd)1 | 0.05 | 0.05 | 0.02 |
| Example 57 | Si-P(CHD-Bd)2 | 0.06 | 0.07 | 0.02 |
| Example 58 | Si-P(CHE-EB-CHE)1 | 0.07 | 0.08 | 0.02 |
| Example 59 | Si-P(CHE-EB-CHE)2 | 0.08 | 0.09 | 0.03 |

TABLE 4

| Comparative Examples | Polymer | Weight reduction ratio (%) | | |
|---|---|---|---|---|
| | | In CHCl$_3$ | In MeOH | In 35 wt % Hydrochloric acid |
| Comparative Example 1 | PCHD1 | 4.10 | 0.50 | 0.30 |
| Comparative Example 2 | PCHD2 | 9.03 | 0.80 | 0.50 |
| Comparative Example 3 | P(CHD-Bd)1 | Dissolved completely | 3.50 | 0.50 |
| Comparative Example 4 | P(CHD-Bd-CHD)1 | 12.6 | 1.20 | 0.40 |
| Comparative Example 5 | P(CHD-Bd-CHD)2 | Dissolved completely | 2.50 | 0.40 |
| Comparative Example 6 | PCHE1 | 3.90 | 0.40 | 0.30 |

TABLE 4-continued

| Comparative Examples | Polymer | Weight reduction ratio (%) | | |
|---|---|---|---|---|
| | | In CHCl$_3$ | In MeOH | In 35 wt % Hydrochloric acid |
| Comparative Example 7 | P(CHD-EB)1 | 8.76 | 3.40 | 0.50 |
| Comparative Example 8 | P(CHD-EB-CHD)1 | 12.4 | 0.90 | 0.40 |
| Comparative Example 9 | Silylated polypropyrene glycol | 0.80 | 0.70 | 0.30 |

TABLE 5

| | Resistance to chemicals (Weight reduction ratio %) | | | Thermal resistance (b value) | | |
|---|---|---|---|---|---|---|
| | CHCl$_3$ | 35 wt % Hydrochloric acid | MeOH | 0th day | 14th day | 28th day |
| Example 63 | 0.01 | 0.01 | 0.01 | 3.1 | 3.1 | 3.1 |
| Example 64 | 0.01 | 0.01 | 0.01 | 3.5 | 3.5 | 3.5 |
| Example 65 | 0.03 | 0.01 | 0.02 | 3.6 | 3.6 | 3.6 |
| Comparative Example 13 | 0.80 | 0.30 | 0.70 | 3.5 | 5.5 | 9.5 |

What is claimed is:

1. A curable resin which comprises at least one polymer selected from polymers each independently having a polymer chain represented by the following formula (I):

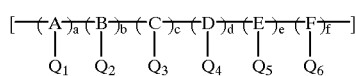
(I)

wherein A to F are monomer units constituting a main chain of said polymer chain in which monomer units A to F are arranged in any order, and a to f are, respectively, weight percentages of monomer units A to F, based on the total weight of monomer units A to F;
wherein:
each A monomer unit is independently selected from the group consisting of cyclic olefin monomer units each having no reactive group,
each B monomer unit is independently selected from the group consisting of cyclic conjugated diene monomer units each having no reactive group,
each C monomer unit is independently selected from the group consisting of chain conjugated diene monomer units each having no reactive group,
each D monomer unit is independently selected from the group consisting of vinyl aromatic monomer units each having no reactive group,
each E monomer unit is independently selected from the group consisting of polar monomer units each having no reactive group, and
each F monomer unit is independently selected from the group consisting of an ethylene monomer unit having no reactive group and α-olefin monomer units each having no reactive group;

wherein:
a to f satisfy the following requirements:
a+b+c+d+e+f=100,
0≦a, b≦100,
0≦c, d, e, f<100, and
a+b≠0; and
wherein:
$Q_1$ to $Q_6$ are reactive groups, which are, respectively, directly bonded to monomer units A to F wherein $Q_1$ to $Q_6$ are the same or different,
wherein the average total number (J) of $Q_1$ to $Q_6$ of said at least one polymer satisfies the following requirement:

1≦(J)≦4, said at least one polymer having a number average molecular weight of from 1,000 to 5,000,000.

2. The curable resin according to claim 1, wherein each of reactive groups $Q_1$ to $Q_6$ independently represents a functional group selected from the group consisting of a $C_4$–$C_{20}$ cyclodienyl group, a thiol group, a carboxyl group, an acid anhydride-containing group, a hydrazinocarbonyl group, an amino group, a hydroxyl group, an epoxy group, an imino group, an isocyanate group, a sulfonic acid group, an ester group, a silyl group, a siloxy group, a vinyl group, a methylol group, a silanol group, a silyl ether group, a silyl ester group, an ether group, an epoxy group, a carbonyl group, a formyloxy group, an imido group, an acetoxy group, an alkoxysilane group and an oxazoline group, or independently represents a hydrocarbon group substituted with said functional group, said hydrocarbon group being selected from the group consisting of a $C_1$–$C_{20}$ alkyl group, a $C_2$–$C_{20}$ unsaturated hydrocarbon group, a $C_3$–$C_{20}$ cycloalkyl group, a $C_5$–$C_{20}$ aryl group and a $C_4$–$C_{20}$ cyclodienyl group, or independently represents an organic compound residue, exclusive of said hydrocarbon group, containing said functional group or said hydrocarbon group substituted with said functional group.

3. The curable resin according to claim 2, wherein each of said reactive groups $Q_1$ to $Q_6$ independently represents a functional group selected from the group consisting of a silyl group, a silyl ether group, a siloxy group, a silanol group, a silyl ester group, a vinyl group and an epoxy group, or independently represents an organic compound residue containing said functional group.

4. The curable resin according to any one of claims 1 to 3, wherein a satisfies the requirement: a=100.

5. The curable resin according to any one of claims 1 to 3, wherein a and b satisfy the requirements: a+b=100, and 0<b.

6. The curable resin according to any one of claims 1 to 3, wherein a and c satisfy the requirements: a+c=100, and 0<c.

7. The curable resin according to any one of claims 1 to 3, wherein a and b satisfy the requirements: 0.001≦a+b<100, and 0.01≦a<100.

8. The curable resin according to any one of claims 1 to 3, wherein a to c satisfy the requirement: a+b+c=100, and at least one requirement selected from the group consisting of 0<b and 0<c.

9. The curable resin according to any one of claims 1 to 3, wherein a to c satisfy the requirement: 0.01≦a+b+c<100, and at least one requirement selected from the group consisting of 0.1≦a<100, 0≦b, and 0<c.

10. The curable resin according to any one of claims 1 to 3, wherein b and c satisfy the requirements: b=0 and c=0.

11. The curable resin according to any one of claims 1 to 3, wherein said at least one polymer is a block copolymer having at least one polymer block containing at least one A monomer unit.

12. A sealant comprising a curable resin of claim 1.

13. An adhesive comprising a curable resin of claim 1.

14. A paint comprising a curable resin of claim 1.

15. An additive for a cement, comprising a curable resin of claim 1.

16. A resin composition comprising a resin ($\alpha$) of claim 1 and a resin ($\beta$) other than said resin ($\alpha$), wherein the weight percentage of said resin ($\beta$), based on the total weight of said resin ($\alpha$) and said resin ($\beta$), is represented by the formula: 0.01 wt %$\leq \beta \leq$99.9 wt %.

17. A resin composition comprising a resin ($\alpha$) of claim 1, a resin ($\beta$) other than said resin ($\alpha$), and at least one crosslinking agent ($\gamma$), wherein the weight percentages of said resin ($\beta$) and said at least one crosslinking agent ($\gamma$), based on the total weight of said resin ($\alpha$), said resin ($\beta$) and said crosslinking agent ($\gamma$), are, respectively, represented by the formulae: 0 wt %$\leq \beta <$100 wt %, and 0 wt %$<\gamma <$100 wt %.

18. A sealant comprising a resin composition of claim 16 or 17.

19. An adhesive comprising a resin composition of claim 16 or 17.

20. A paint comprising a resin composition of claim 16 or 17.

21. An additive for a cement, comprising a resin composition of claim 16 or 17.

* * * * *